(12) United States Patent
Tabata et al.

(10) Patent No.: US 7,226,385 B2
(45) Date of Patent: Jun. 5, 2007

(54) CONTROL APPARATUS FOR CONTROLLING DRIVING DEVICE OF VEHICLE

(75) Inventors: Atsushi Tabata, Okazaki (JP); Yutaka Taga, Aichi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 251 days.

(21) Appl. No.: 11/140,992

(22) Filed: Jun. 1, 2005

(65) Prior Publication Data
US 2005/0272555 A1 Dec. 8, 2005

(30) Foreign Application Priority Data
Jun. 3, 2004 (JP) ............... 2004-165806

(51) Int. Cl.
*B60W 10/04* (2006.01)
(52) U.S. Cl. ............................. 477/5; 475/5
(58) Field of Classification Search ............... 477/3–5; 475/3, 5
See application file for complete search history.

(56) References Cited

U.S. PATENT DOCUMENTS

| | | | | |
|---|---|---|---|---|
| 5,713,814 | A | * | 2/1998 | Hara et al. ............ 477/5 |
| 6,569,054 | B2 | * | 5/2003 | Kato ............... 477/5 |
| 2002/0045507 | A1 | | 4/2002 | Bowen |
| 2005/0245350 | A1 | * | 11/2005 | Tabata et al. ............ 477/34 |

FOREIGN PATENT DOCUMENTS

| | | |
|---|---|---|
| DE | 19808169 A1 | 2/1998 |
| JP | 11-198668 A | 7/1999 |
| JP | 2003-127681 A | 5/2003 |
| JP | 2003-130202 A | 5/2003 |
| JP | 2003-130203 A | 5/2003 |

OTHER PUBLICATIONS

Oct. 4, 2006 Office Action in German Application No. 10 2005 025 654.6-32, for applicant Toyota Jidosha Kabushiki Kaisha.

* cited by examiner

*Primary Examiner*—Ha Ho
(74) *Attorney, Agent, or Firm*—Kenyon & Kenyon LLP

(57) ABSTRACT

A control apparatus for controlling a driving device of a vehicle, the driving device including a transmission system including (A) a non-step speed change portion which includes (a1) a differential device including a first rotary element connected to an engine, a second rotary element connected to a first electric motor, and a third rotary element connected to a transmission member, and (a2) a second electric motor provided in a power transmission path between the transmission member and drive wheels, and (B) a stepwise speed change portion; the control apparatus including a differential-state switching device which selectively switches the differential device to a differential state and to a non-differential state, and a rotation speed synchronization controller which performs a synchronization control of respective rotation speeds of the first, second, and third rotary elements to respective rotation speeds thereof after completion of a stepwise speed change control.

20 Claims, 15 Drawing Sheets

|  | C0 | C1 | C2 | B0 | B1 | B2 | B3 | SPEED RATIO | SPEED-RATIO STEP |
|---|---|---|---|---|---|---|---|---|---|
| 1st | ◎ | ○ |  |  |  |  | ○ | 3.357 | 1.54 |
| 2nd | ◎ | ○ |  |  |  | ○ |  | 2.180 | 1.53 |
| 3rd | ◎ | ○ |  |  | ○ |  |  | 1.424 | 1.42 |
| 4th | ◎ | ○ | ○ |  |  |  |  | 1.000 | 1.42 |
| 5th |  | ○ | ○ | ◎ |  |  |  | 0.705 | TOTAL STEP 4.76 |
| R |  |  | ○ |  |  |  | ○ | 3.209 | |
| N | ○ |  |  |  |  |  |  |  | |

○ ENGAGED
◎ ENGAGED FOR STEPWISE CONTROL
   RELEASED FOR NON-STEP CONTROL

I ------ INPUT
O ------ OUTPUT

|  | C0 | C1 | C2 | B0 | B1 | B2 | SPEED RATIO | SPEED-RATIO STEP |
|---|---|---|---|---|---|---|---|---|
| 1st | ◎ | ○ |  |  |  | ○ | 2.804 | 1.54 |
| 2nd | ◎ | ○ |  |  | ○ |  | 1.531 | 1.53 |
| 3rd | ◎ | ○ | ○ |  |  |  | 1.000 | 1.42 |
| 4th |  | ○ | ○ | ◎ |  |  | 0.705 | TOTAL STEP |
| R |  |  | ○ |  |  | ○ | 2.393 | 3.977 |
| N | ○ |  |  |  |  |  |  |  |

○ ENGAGED
◎ ENGAGED FOR STEPWISE CONTROL
  RELEASED FOR NON-STEP CONTROL

I ------ INPUT
O ------ OUTPUT

CONTROL APPARATUS FOR CONTROLLING DRIVING DEVICE OF VEHICLE

The present application is based on Japanese Patent Application No. 2004-165806 filed on Jun. 3, 2004, the contents of which are incorporated herein by reference.

BACKGROUND OF THE INVENTION

Field of the Invention

The present invention relates to a control apparatus for controlling a driving device of a vehicle, in particular a driving device including a differential device that has a differential function and thereby operates as a speed change device, i.e., a transmission, and additionally including a stepwise automatic transmission, and relates particularly to the art of controlling the differential device when speed steps of the driving device are changed.

There is known a driving device of a vehicle that includes a differential device that distributes an output of an engine to a first electric motor and an output shaft; and a second electric motor that is provided between the output shaft of the differential device, and the drive wheels. An example of a driving device of a hybrid vehicle is disclosed by each of Japanese Patent Application Publication No. 2003-130202, Japanese Patent Application Publication No. 2003-130203, Japanese Patent Application Publication No. 2003-127681, and Japanese Patent Application Publication No. 11(1999)-198668. In the hybrid-vehicle driving device, the differential device is constituted by, e.g., a planetary gear set, and mechanically transmits, owing to a differential function of the planetary gear set, a main portion of power of the engine to the drive wheels, and electrically transmits the remaining portion of the power via an electric path from the first electric motor to the second electric motor. Thus, the differential device functions as a transmission whose speed ratio is electrically changed, for example, an electric CVT (continuously variable transmission). The differential device is controlled by a control device so that the vehicle may run while the engine is kept in an optimum operating state. Thus, a fuel consumption rate of the vehicle is improved. In addition, the vehicle driving device, disclosed by the above-indicated Japanese Publication No. 2003-130202, further employs a stepwise automatic transmission provided in a power transmission path between the output shaft of the differential device and the drive wheels, for the purpose of, e.g., reducing the size of the second motor.

SUMMARY OF THE INVENTION

Generally, a speed change control of a driving device including a stepwise automatic transmission employing a plurality of coupling devices is performed by changing speed steps of the stepwise automatic transmission by engaging and/or disengaging (releasing) of the coupling devices. Also, in the vehicle driving device, disclosed by the above-indicated Japanese Publication No. 2003-130202, not only the operation of the differential device as the electric CVT but also the stepwise speed change of the stepwise automatic transmission provided in the power transmission path between the output shaft of the differential device and the drive wheels are likewise performed by engaging and/or disengaging of coupling devices.

However, a speed change shock may occur depending upon a timing when the engaging and/or disengaging of coupling devices are/is performed to change the speed steps of the stepwise automatic transmission. In particular, in a driving device, as disclosed by the above-indicated Japanese Publication No. 2003-130202, wherein a hydraulic power transmission such as a torque converter is not employed, the changing of speed steps results in changing univocally the rotation speed of the engine relative to the running speed of the vehicle, and accordingly a speed change shock may occur with more possibilities. Generally, it is preferred to complete the changing of speed steps in a short time so as to decrease a time period in which the driving power is not transmitted. However, if the timing when the engaging and/or disengaging of coupling devices are/is performed is so selected as to decrease the speed change period, the problem of speed change shock may be amplified.

It is therefore an object of the present invention to provide a control apparatus which controls a driving device of a vehicle, the driving device including a differential device that has a differential function and thereby operates as a transmission, and additionally including a stepwise automatic transmission, and which can restrain a speed change shock when a speed change control of the driving device is performed.

According to a first aspect of the present invention, there is provided a control apparatus for controlling a driving device of a vehicle, the driving device including a transmission system including (A) a non-step speed change portion which includes (a1) a differential device including a first rotary element connected to an engine, a second rotary element connected to a first electric motor, and a third rotary element connected to a transmission member, and (a2) a second electric motor provided in a power transmission path between the transmission member and a plurality of drive wheels, and which functions as an electric, continuously variable transmission, and (B) a stepwise speed change portion which constitutes a portion of the power transmission path and functions as a stepwise automatic transmission, the control apparatus comprising a differential-state switching device which is associated with the differential device and selectively switches the differential device to a differential state thereof in which the non-step speed change portion can operate as the electric continuously variable transmission, and to a non-differential state thereof in which the non-step speed change portion cannot operate as the electric continuously variable transmission; and a rotation speed synchronization controller which, when a stepwise speed change control of the transmission system is performed, performs, with at least one of the first and second electric motors, a synchronization control of respective rotation speeds of the first, second, and third rotary elements, to respective rotation speeds thereof after completion of the stepwise speed change control.

Thus, the driving device includes the differential device which is so arranged as to be switchable, by the differential-state switching device, to the differential state in which the non-step speed change portion can operate as the electric continuously variable transmission (CVT), and to the non-differential state in which the non-step speed change portion cannot operate as the electric CVT. When the stepwise speed change control of the transmission system including the non-step speed change portion and the stepwise speed change portion is performed, the rotation speed synchronization controller operates at least one of the first and second electric motors, and thereby performs the synchronization control of the respective rotation speeds of the first, second, and third rotary elements of the differential device, to the respective rotation speeds thereof after the completion of the stepwise speed change control. Therefore, the present control apparatus can restrain the speed change shock that might otherwise occur to the driving device.

According to a second aspect of the present invention, there is provided a control apparatus for controlling a driving device of a vehicle, the driving device including a transmission system including (A) a non-step speed change portion which includes (a1) a differential device including a first rotary element connected to an engine, a second rotary element connected to a first electric motor, and a third rotary element connected to a transmission member, and (a2) a second electric motor provided in a power transmission path between the transmission member and a plurality of drive wheels, and which functions as an electric, continuously variable transmission, and (B) a stepwise speed change portion which constitutes a portion of the power transmission path and functions as a stepwise automatic transmission, the control apparatus comprising a differential-state switching device which is associated with the differential device and selectively switches the differential device to a differential state thereof in which the non-step speed change portion can operate as the electric continuously variable transmission, and to a non-differential state thereof in which the non-step speed change portion cannot operate as the electric continuously variable transmission; and a rotation speed synchronization controller which, when a stepwise speed change control of the transmission system is performed, performs, with at least one of the first and second electric motors, a synchronization control of a rotation speed of the engine to a rotation speed thereof after completion of the stepwise speed change control.

Thus, the driving device includes the differential device which is so arranged as to be switchable, by the differential-state switching device, to the differential state in which the non-step speed change portion can operate as the electric CVT, and to the non-differential state in which the non-step speed change portion cannot operate as the electric CVT. When the stepwise speed change control of the transmission system including the non-step speed change portion and the stepwise speed change portion is performed, the rotation speed synchronization controller operates at least one of the first and second electric motors, and thereby performs the synchronization control of the rotation speed of the engine to the rotation speed thereof after the completion of the stepwise speed change control. Therefore, the present control apparatus can restrain the speed change shock that might otherwise occur to the driving device.

According to a preferred feature of the first or second aspect of the present invention, the differential-state switching device selectively establishes, as the non-differential state, one of a first non-differential state in which the first, second, and third rotary elements are rotated as a unit, and a second non-differential state in which the second rotary element is not rotated, and wherein the rotation speed synchronization controller selects, when the stepwise speed change control is performed, one of a plurality of different rotation speed synchronization control methods that corresponds to a judgment about whether a switching between the first and second non-differential states is performed. Thus, when the stepwise speed change control is performed, the synchronization control of the rotation speeds of the first, second, and third rotary elements, or the synchronization control of the rotation speed of the engine can be appropriately performed. Thus, the speed change shock can be restrained.

According to another feature of the first or second aspect of the present invention, when the stepwise speed change control is performed, the rotation speed synchronization controller temporarily switches, when the switching between the first and second non-differential states is performed, the differential device to the differential state thereof, and performs the synchronization control owing to an operation of the non-step speed change portion as the electric continuously variable transmission. Thus, even if the respective relative rotation speeds of the first, second and third rotary elements, or the rotation speed of the engine may be changed by the switching between the first non-differential state and the second non-differential state, the rotation speeds of the first through third rotary elements, or the rotation speed of the engine can be quickly synchronized or changed to the rotation speeds of the three rotary elements, or the rotation speed of the engine, after the completion of the stepwise speed change control, the rotation speeds or the rotation speed being univocally determined based on a vehicle speed and a speed ratio. Thus, the speed change shock can be restrained.

According to another feature of the first or second aspect of the present invention, when the stepwise speed change control is performed, the rotation speed synchronization controller keeps, when the switching between the first and second non-differential states is not performed, the differential device to the non-differential state thereof, and performs the synchronization control. Thus, the rotation speeds of the first through third rotary elements, or the rotation speed of the engine can be quickly synchronized or changed to the rotation speeds of the three rotary elements, or the rotation speed of the engine, after the completion of the stepwise speed change control, the rotation speeds or the rotation speed being univocally determined based on the vehicle speed and the speed ratio. Thus, the speed change shock can be restrained.

According to another feature of the first or second aspect of the present invention, the rotation speed synchronization controller performs, when the at least one of the first and second electric motors cannot be used, one of the stepwise speed change control of the stepwise speed change portion and the switching between the first and second non-differential states. Thus, at least a speed change control that is commonly performed by stepwise automatic transmissions, for example, a stepwise speed change control wherein engaging and disengaging of coupling devices are performed, can be performed as a substitute control. Thus, the speed change shock can be restrained.

According to another feature of the first or second aspect of the present invention, the differential-state switching device comprises at least one of (a) a clutch which connects at least two rotary elements of the first, second, and third rotary elements, to each other, so as to establish the first non-differential state and (b) a brake which connects the second rotary element to a non-rotary element so as to establish the second non-differential state. Thus, the differential device can be easily switched to the first non-differential state and to the second non-differential state.

According to another feature of the first or second aspect of the present invention, the differential-state switching device comprises the clutch and the brake, wherein when the clutch and the brake are disengaged, the differential device is switched to the differential state thereof in which the first, second, and third rotary elements are rotated relative to each other and the non-step speed change portion operates as the electric continuously variable transmission, wherein when the clutch is engaged and the brake is disengaged, the differential device is switched to the first non-differential state thereof and the non-step speed change portion operates as a transmission whose speed ratio is equal to 1, and wherein when the brake is engaged and the clutch is disengaged, the differential device is switched to the second non-differential state thereof and the non-step speed change portion operates as a speed increase transmission whose speed ratio is smaller than 1. Thus, the differential device can be switched to the differential state and to the non-differential state, and can be operated as a transmission having a single or plural constant speed ratio or ratios.

According to another feature of the first or second aspect of the present invention, the differential device comprises a planetary gear set including a carrier, a sun gear, and a ring gear, and the first, second, and third rotary elements of the differential device comprise the carrier, the sun gear, and the ring gear, respectively. Thus, a dimension of the differential device in an axial direction thereof can be decreased. In addition, the differential device can be constituted by the singe planetary gear set.

According to another feature of the first or second aspect of the present invention, the planetary gear set comprises a single-pinion planetary gear set including a pinion. Thus, the dimension of the differential device in the axial direction thereof can be decreased. In addition, the differential device can be constituted by the singe single-pinion planetary gear set.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE PREFERRED EMBODIMENTS

Hereinafter, there will be described in detail preferred embodiments of the present invention by reference to the drawings.

First Embodiment

Figures 1, 2:
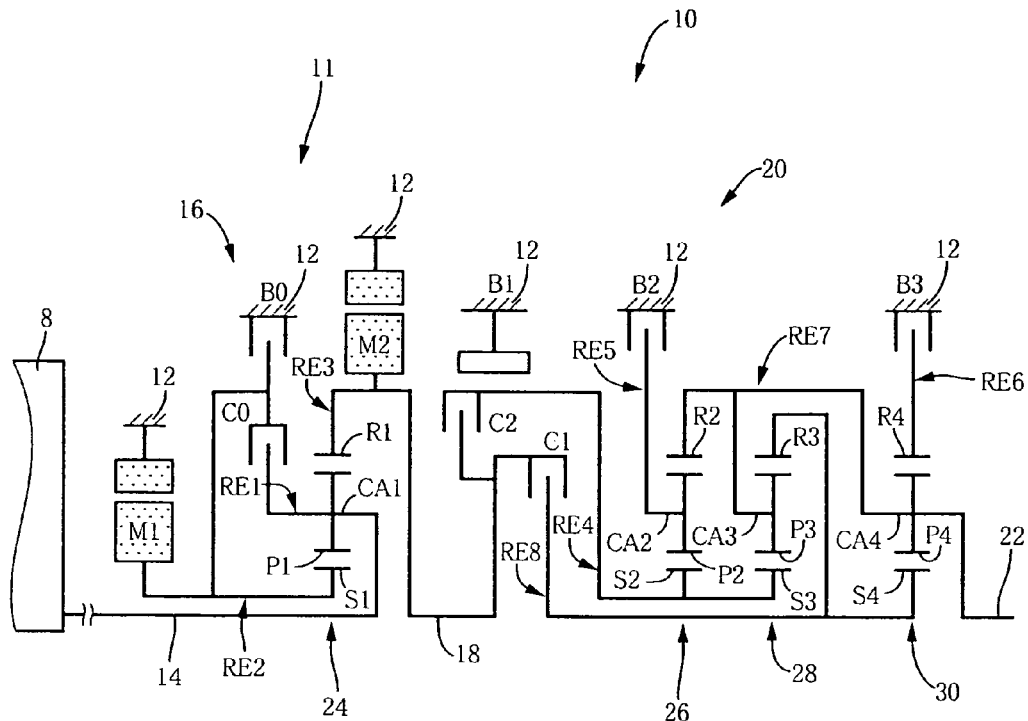
FIG. 1 is a schematic view for explaining a construction of a transmission system as a portion of a driving device of a hybrid vehicle to which the present invention is applied.
FIG. 2 is an operation table representing a relationship between non-step or stepwise speed change operations of the transmission system, and combinations of respective operating states of hydraulically operated frictional coupling devices that are used to perform those speed change operations, respectively.

FIG. 1 is a schematic view for explaining a transmission system 10 constituting a portion of a driving device of a so-called "hybrid" automotive vehicle to which the present invention is applied. The hybrid vehicle additionally includes an electronic control device 40 shown in FIG. 4. In FIG. 1, the transmission system 10 includes an input shaft 14 as a rotary input member, a non-step (i.e., continuous) speed change portion 11, a stepwise automatic speed change portion 20 (hereinafter, referred to as the "stepwise speed change portion 20") functioning as a stepwise automatic transmission, and an output shaft 22 as a rotary output member all of which are provided, in series, on a common axis in a transmission case 12 (hereinafter referred to as the "case 12") as a non-rotary (i.e., stationary) member that is fixed to a body of the vehicle. The non-step speed change portion 11 is connected to the input shaft 14 directly, but it may be connected indirectly via, e.g., a pulsation absorbing damper (i.e., a vibration damping device), not shown. The stepwise speed change portion 20 is connected, in series, to the non-step speed change portion 11 via a transmission member 18 (e.g., a transmission shaft), in a power transmission path between the non-step speed change portion 11 and a pair of drive wheels 38 (FIG. 5) of the vehicle. The output shaft 22 is connected to the stepwise speed change portion 20. The transmission system 10 is preferably employed by an FR (front engine, rear drive) vehicle in which the system 10 is provided along a longitudinal axis of the vehicle. More specifically described, the transmission system 10 is provided between an internal combustion engine (E/G) 8 (hereinafter, referred to as the engine 8) such as a gasoline engine or a diesel engine, and the two drive wheels 38. The engine 8 functions as a driving power source that produces a driving power to drive or run the vehicle, and is connected to the input shaft 14 either directly, or indirectly via, e.g., the pulsation absorbing damper, not shown. As shown in FIG. 5, the transmission system 10 transmits the driving power produced by the engine 8, to the two drive wheels 38 via, first, a differential gear unit (e.g., a final reduction gear) 36 and, then, two axle shafts. The differential gear unit 36 constitutes another portion of the driving device, and is provided in the power transmission path. Since the transmission system 10 has a symmetrical construction with respect to the above-indicated common axis, a lower half portion of the system 10 is not shown in FIG. 1. This applies to another transmission system 70 as a second embodiment, shown in FIG. 14. In the present transmission system 10 as a first embodiment, the non-step speed change portion 11 is "directly coupled" to the engine 8. The phrase "directly coupled" means that the non-step speed change portion 11 is connected to the engine 8 in such a manner that a hydraulic power transmission such as a torque converter or a fluid coupling is not provided between the two elements 11, 8, and accordingly the phrase "directly coupled" encompasses the above-indicated case where the two elements 11, 8 are connected to each other via, e.g., the pulsation absorbing damper.

The non-step speed change portion 11 includes a first electric motor M1, a power transfer 16 as a differential device, and a second electric motor M2. The power transfer 16 is a mechanical device that mechanically distributes the driving power of the engine 8 outputted to the input shaft 14, more specifically described, mechanically distributes the output of the engine 8 to the first motor M1 and the transmission member 18. The second motor M2 is rotated integrally with the transmission member 18. The second motor M2 may be provided anywhere in a portion of the power transmission path that is located between the transmission member 18 and the drive wheels 38. Though each of the first and second motors M1, M2 is a so-called "motor generator" that has the function of generating electric power, the first motor M1 functions as at least a generator that produces a reaction force, and the second motor M2 functions as at least a motor that produces a driving force.

The power transfer 16 is essentially constituted by a single-pinion first planetary gear set 24 having a pre-determined gear ratio $\rho 1$, e.g., about 0.418; a switching clutch C0; and a switching brake B0. The first planetary gear set 24 includes, as a plurality of rotary elements thereof (i.e., a plurality of elements thereof), a first sun gear S1; a first planetary gear P1; a first carrier CA1 supporting the first planetary gear P1 such that the planetary gear P1 can be rotated and revolved; and a first ring gear R1 engaging the first sun gear S1 via the first planetary gear P1. Providing that a number of teeth of the first sun gear S1 is expressed as ZS1 and a number of teeth of the first ring gear R1 is expressed as ZR1, the above-indicated gear ratio $\rho 1$ of the first planetary gear set 24 is expressed as $\rho 1 = ZS1/ZR1$.

The power transfer 16 is constructed such that the first carrier CA1 is connected to the input shaft 14 and accordingly the engine 8; the first sun gear S1 is connected to the first motor M1; and the first ring gear R1 is connected to the transmission member 18. In addition, the switching brake B0 is provided between the first sun gear S1 and the case 12, and the switching clutch C0 is provided between the first sun gear S1 and the first carrier CA1. In a state in which the clutch C0 and the brake B0 are both disengaged (i.e., released), the first sun gear S1, the first carrier CA1 and the first ring gear R1 as the three elements of the first planetary gear set 24 can be rotated relative to each other, so that the power transfer 16 is switched to a differential state in which the power transfer 16 operates as the differential device and accordingly the output of the engine 8 is distributed to the first motor M1 and the transmission member 18. More specifically described, a portion of the output of the engine 8 is stored as electric energy produced by the first motor M1, and another portion of the output of the engine 8 is used to rotate the second motor M2, so that the non-step speed change portion 11 is switched to a so-called "non-step speed change state" in which the portion 11 operates as an electric CVT (continuously variable transmission). Thus, when the engine 8 is rotated at a constant speed, a speed of rotation of the transmission member 18 is continuously changed. That is, when the power transfer 16 is switched to the differential state, the non-step speed change portion 11 is switched to the non-step speed change state in which the portion 11 operates as the electric CVT and accordingly a speed ratio (i.e., a transmission gear ratio) $\gamma 0$ of the portion 11 can be continuously changed between a minimum value $\gamma 0_{min}$ and a maximum value $\gamma 0_{max}$. The speed ratio $\gamma 0$ of the non-step speed change portion 11 is defined as a value obtained by dividing the rotation speed of the input shaft 14 by the rotation speed of the transmission member 18.

In the above-indicated non-step speed change state, if either the switching clutch C0 or the switching brake B0 is engaged, then the power transfer 16 is switched to a non-differential state in which the transfer 16 cannot operate as the differential device. More specifically described, in a state in which the switching clutch C0 is engaged (but the switching brake B0 remains disengaged) and accordingly the first sun gear S1 and the first carrier CA1 are integrally engaged with each other, the first sun gear S1, the first carrier CA1, and the first ring gear R1 as the three elements of the first planetary gear set 24 are placed in a locked state in which the three elements are rotated as an integral unit, so that the power transfer 16 is switched to in a first non-differential state in which the power transfer 16 cannot operate as the differential device. Since, in the first non-differential state, the respective rotation speeds of the engine 8 and the transmission member 18 are equal to each other, the non-step speed change portion 11 is switched to a constant speed change state in which the portion 11 operates as a transmission whose speed ratio γ0 is fixed at 1. Alternatively, if the switching brake B0 is engaged (but the switching clutch C0 is disengaged) and accordingly the first sun gear S1 is connected to the case 12, the first sun gear S1 is placed in a locked state in which the first sun gear S1 cannot be rotated, so that the power transfer 16 is switched to a second non-differential state in which the power transfer 16 cannot operate as the differential device. Since, in the second non-differential state, the first ring gear R1 is rotated at a speed higher than that of the first carrier CA1, the non-step speed change portion 11 is placed in a different constant speed change state in which the portion 11 operates as a speed-increase transmission whose speed ratio γ0 is fixed at a value smaller than 1, e.g., a value equal to about 0.7. Thus, in the present embodiment, each of the switching clutch C0 and the switching brake B0 functions as a state switching device that selectively switches the power transfer 16 or the non-step speed change portion 11 to the non-step speed change state in which the portion 11 operates as the electric CVT, i.e., the speed ratio γ0 of the portion 11 can be continuously changed, or to the locked state in which the portion 11 does not operate as the electric-CVT, i.e., the speed ratio γ0 of the portion 11 is fixed at a certain value, that is, the constant speed change state in which the portion 11 operates as a single-step or plural-step transmission having one or more constant or fixed speed ratios.

The stepwise speed change portion 20 includes a single-pinion second planetary gear set 26, a single-pinion third planetary gear set 28, and a single-pinion fourth planetary gear set 30. The second planetary gear set 26 includes a second sun gear S2; a second planetary gear P2; a second carrier CA2 supporting the second planetary gear P2 such that the planetary gear P2 can be rotated and revolved; and a second ring gear R2 engaging the second sun gear S2 via the second planetary gear P2. The second planetary gear set 26 has a pre-determined gear ratio ρ2, e.g., about 0.562. The third planetary gear set 28 includes a third sun gear S3; a third planetary gear P3; a third carrier CA3 supporting the third planetary gear P3 such that the planetary gear P3 can be rotated and revolved; and a third ring gear R3 engaging the third sun gear S3 via the third planetary gear P3. The third planetary gear set 28 has a pre-determined gear ratio ρ3, e.g., about 0.425. The fourth planetary gear set 30 includes a fourth sun gear S4; a fourth planetary gear P4; a fourth carrier CA4 supporting the fourth planetary gear P4 such that the planetary gear P4 can be rotated and revolved; and a fourth ring gear R4 engaging the fourth sun gear S4 via the fourth planetary gear P4. The fourth planetary gear set 30 has a pre-determined gear ratio ρ4, e.g., about 0.421. Providing that respective teeth numbers of the second sun gear S2, the second ring gear R2, the third sun gear S3, the third ring gear R3, the fourth sun gear S4, and the fourth ring gear R4 are expressed as ZS2, ZR2, ZS3, ZR3, ZS4, and ZR4, respectively, the above-indicated gear ratios ρ2, ρ3, ρ4 are defined as ρ2=ZS2/ZR2, ρ3=ZS3/ZR3, and ρ4=ZS4/ZR4, respectively.

In the stepwise speed change portion 20, the second and third sun gears S2, S3 are integrally connected to each other, are selectively connectable to the transmission member 18 via a second clutch C2, and are selectively connectable to the case 12 via a first brake B1; the second carrier CA2 is selectively connectable to the case 12 via a second brake B2; the fourth ring gear R4 is selectively connectable to the case 12 via a third brake B3; the second ring gear R2, the third carrier CA3 and the fourth carrier CA4 are integrally connected to each other, and are connected to the output shaft 22; and the third ring gear R3 and the fourth sun gear S4 are integrally connected to each other, and are selectively connectable to the transmission member 18 via a first clutch C1.

Each of the above-described switching clutch C0, first clutch C1, second clutch C2, switching brake B0, first brake B1, second brake B2, and third brake B3 is a hydraulically operated frictional coupling device that is commonly used in conventional vehicle's automatic transmissions, and may be of a plate type in which a plurality of friction plates stacked on each other are pressed by a hydraulic actuator, or of a band type in which one end, or respective one ends, of one or two bands wound around an outer circumferential surface of a rotary drum is or are tightened by a hydraulic actuator. Each of the frictional coupling devices is for selectively connecting two members, between which the each coupling device is provided, to each other.

In the transmission system 10 constructed as described above, the switching clutch C0, the first clutch C1, the second clutch C2, the switching brake B0, the first brake B1, the second brake B2, and the third brake B3 are selectively engaged or disengaged, as indicated in an operation table shown in FIG. 2, so as to establish selectively one of a first speed step ($1^{st}$), a second speed step ($2^{nd}$), a third speed step ($3^{rd}$), a fourth speed step ($4^{th}$), a fifth speed step ($5^{th}$), a reverse speed step (R), and a neutral position (N). Respective speed ratios γ of the first to fifth speed steps $1^{st}$ through $5^{th}$ change with a substantially same ratio. Each speed ratio γ is defined as being equal to (rotation speed $N_{IN}$ of input shaft 14)/(rotation speed $N_{OUT}$ of output shaft 22). In the operation table of FIG. 2, symbol "O" indicates an engaged state of each clutch C0, C1, C2 or each brake B1, B2, B3; and symbol "⊚" indicates an engaged state of the switching clutch or brake C0, B0 when the non-step speed change portion 11 operates in the constant speed change state, and a disengaged (i.e., released) state of the same C0, B0 when the non-step speed change portion 11 operates as the electric CVT. In the present embodiment, the power transfer 16 employs the switching clutch C0 and the switching brake B0 and, when either the switching clutch C0 or the switching brake B0 is engaged, the non-step speed change portion 11 can take the constant speed change state in which the portion 11 operates as the transmission whose speed ratio γ0 is fixed, in addition to the non-step speed change state in which the portion 11 operates as the electric CVT. Therefore, when either the switching clutch C0 or the switching brake B0 is engaged, the transmission system 10 can take a stepwise speed change state in which the non-step speed change portion 11, placed in the constant speed change state, cooperates with the stepwise speed change portion 20 to operate as a stepwise variable transmission; and when neither the switching clutch C0 nor the switching brake B0 is engaged, the transmission system 10 can take a non-step (i.e., continuous) speed change state in which the non-step speed change portion 11, placed in the non-step speed change state, cooperates with the stepwise speed change portion 20 to operate as an electric CVT. In short, when either the switching clutch C0 or the switching brake B0 is engaged, the transmission system 10 is switched to the stepwise speed change state; and when neither the switching clutch C0 nor the switching brake B0 is engaged, the transmission system 10 is switched to the non-step speed change state. In addition, it can be said that like the transmission system 10, the non-step speed change portion 11 is a transmission that can be selectively switched to the stepwise speed change state and the non-step speed change state.

For example, when the transmission system 10 operates as the stepwise variable transmission and simultaneously when the switching clutch C0, the first clutch C1 and the third brake B3 are engaged as shown in FIG. 2, the first speed step $1^{st}$ is established in which a maximum value of a speed ratio γ1 thereof is equal to, e.g., about 3.357; when the switching clutch C0, the first clutch C1 and the second brake B2 are engaged, the second speed step $2^{nd}$ is established in which a speed ratio γ2 thereof is smaller than the speed ratio γ1 and is equal to, e.g., about 2.180; when the switching clutch C0, the first clutch C1 and the first brake B1 are engaged, the third speed step $3^{rd}$ is established in which a speed ratio γ3 thereof is smaller than the speed ratio γ2 and is equal to, e.g., about 1.424; when the switching clutch C0, the first clutch C1 and the second clutch C2 are engaged, the fourth speed step $4^{th}$ is established in which a speed ratio γ4 thereof is smaller than the speed ratio γ3 and is equal to, e.g., about 1.000; and when the switching brake B0, the first clutch C1 and the second clutch C2 are engaged, the fifth speed step $5^{th}$ is established in which a speed ratio γ5 thereof is smaller than the speed ratio γ4 and is equal to, e.g., about 0.705. In addition, when the second clutch C2 and the third brake B3 are engaged, the reverse speed step R is established in which a speed ratio γR thereof is smaller than the speed ratio γ1 and greater than the speed ratio γ2, and is equal to, e.g., about 3.209. When the neutral position N is established, only the switching clutch C0 is engaged.

On the other hand, when the transmission system 10 operates as the CVT, both the switching clutch C0 and the switching brake B0 are disengaged as shown in FIG. 2. Thus, the non-step speed change portion 11 operates as the CVT, and the stepwise speed change portion 20, connected in series to the portion 11, operates as the stepwise variable transmission. Therefore, when the stepwise speed change portion 20 operates in each one of the first speed step $1^{st}$, the second speed step $2^{nd}$, the third speed step $3^{rd}$, and the fourth speed step $4^{th}$, the speed of the rotation inputted to the portion 20, i.e., the rotation speed of the transmission member 18 can be changed with no steps, i.e., continuously, so that each of the first to fourth speed steps has a speed-ratio range in which the speed ratio of the each speed step can be continuously changed. Thus, the speed ratio of the transmission system 10 as a whole can be continuously changed between each pair of adjacent speed steps out of the first to fifth speed steps. That is, a total speed ratio γT of the transmission system 10 as a whole is continuously changeable.

Figure 3:
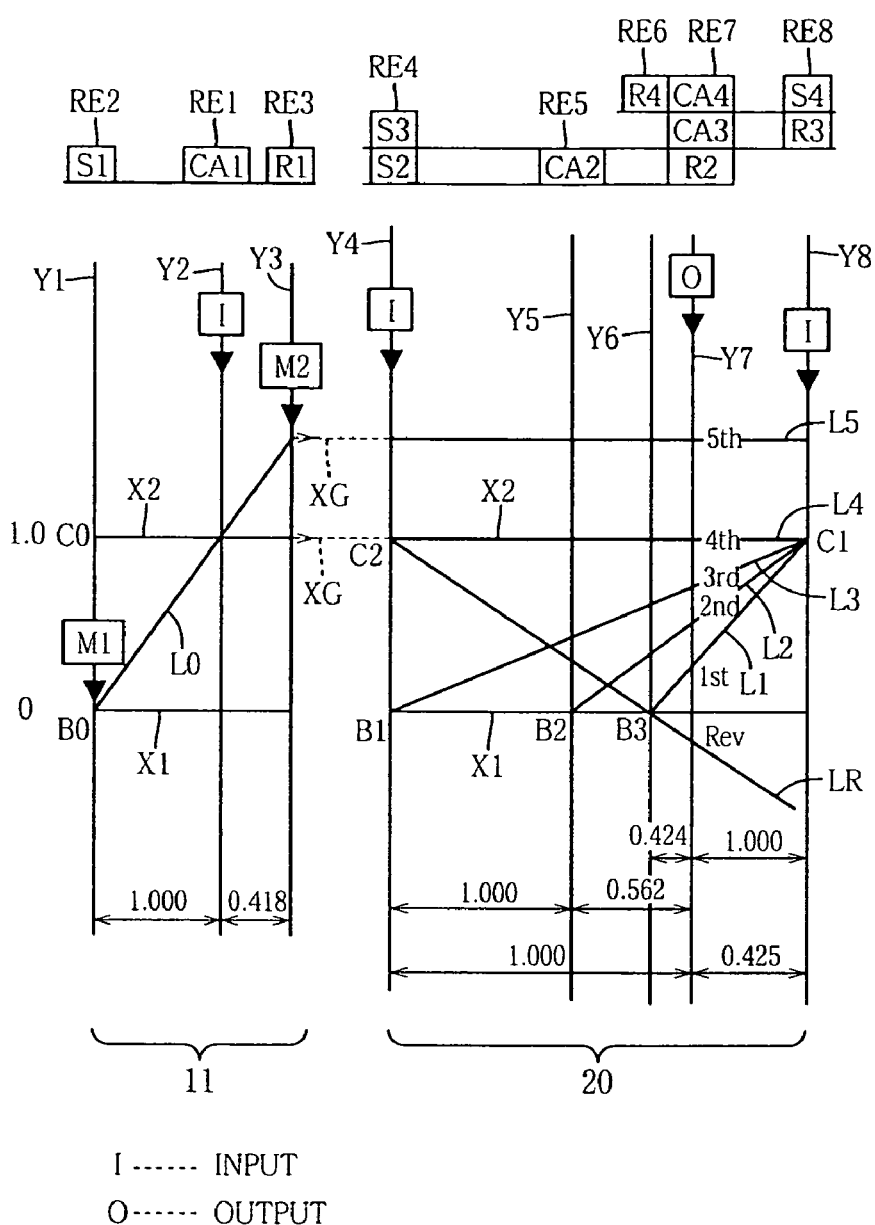
FIG. 3 is a collinear chart for explaining respective relative rotation speeds of eight rotary elements RE1 through RE8 in each of the stepwise speed change operations of the transmission system.

Thus, the transmission system 10 includes the non-step speed change portion 11 functioning as a differential portion or a first speed change portion; and the stepwise speed change portion 20 functioning as an automatic speed change portion or a second speed change portion. FIG. 3 shows a collinear chart showing straight lines representing respective relationships among respective relative rotation speeds of first through eighth rotary elements RE1 through RE8, the relationships corresponding the different speed steps in which the eight rotary elements are connected to each other in different manners. The collinear chart of FIG. 3 is a two-dimensional coordinate system defined by an axis of abscissas indicative of gear ratios p of the first through fourth planetary gear sets 24, 26, 28, 30 and an axis of ordinates indicative of relative rotation speeds of the eight rotary elements. A lower horizontal solid line X1 indicates a rotation speed of 0 (zero); an upper horizontal solid line X2 indicates a rotation speed of 1.0 (one), i.e., the rotation speed $N_E$ of the engine 8 connected to the input shaft 14; and each of two horizontal broken lines XG indicates the rotation speed of the transmission member 18.

Three vertical lines Y1, Y2, Y3 correspond to the three elements of the power transfer 16 as a portion of the non-step speed change portion 11, respectively. In the order from the left toward the right, the first vertical line Y1 indicates a relative rotation speed of the first sun gear S1 corresponding to a second rotary element (i.e., a second element) RE2; the second vertical line Y2 indicates a relative rotation speed of the first carrier CA1 corresponding to a first rotary element (i.e., a first element) RE1; and the third vertical line Y3 indicates a relative rotation speed of the first ring gear R1 corresponding to a third rotary element (i.e., a third element) RE3. The three vertical lines Y1, Y2, Y3 are spaced from each other by respective distances defined according to the gear ratio ρ1 of the first planetary gear set 24. In addition, five vertical lines Y4, Y5, Y6, Y7, Y8 correspond to five elements of the stepwise speed change portion 20, respectively. In the order from the left toward the right, the fourth vertical line Y4 indicates a relative rotation speed of the second and third sun gears S2, S3 connected to each other and corresponding to a fourth rotary element (i.e., a fourth element) RE4; the fifth vertical line Y5 indicates a relative rotation speed of the second carrier CA2 corresponding to a fifth rotary element (i.e., a fifth element) RE5; the sixth vertical line Y6 indicates a relative rotation speed of the fourth ring gear R4 corresponding to a sixth rotary element (i.e., a sixth element) RE6; the seventh vertical line Y7 indicates a relative rotation speed of the second ring gear R2, third carrier CA3, and fourth carrier CA4 connected to each other and corresponding to a seventh rotary element (i.e., a seventh element) RE7; and the eighth vertical line Y8 indicates a relative rotation speed of the third ring gear R3 and the fourth sun gear S4 connected to each other and corresponding to an eighth rotary element (i.e., an eighth element) RE8. The five vertical lines Y4, Y5, Y6, Y7, Y8 are spaced from each other by respective distances defined according to the respective gear ratios ρ2, ρ3, ρ4 of the second, third, and fourth planetary gear sets 26, 28, 30. In the collinear chart of FIG. 3, if a distance between two vertical lines Y corresponding to the sun gear S and the carrier CA of each planetary gear set 24, 26, 28, 30 is equal to 1 (one), then a distance between the carrier CA and the ring gear R of the each planetary gear set 24, 26, 28, 30 is equal to the gear ratio ρ of the each planetary gear set 24, 26, 28, 30. More specifically described, in the non-step speed change portion 11, the distance between the two vertical lines Y1, Y2 is equal to 1, and the distance between the two vertical lines Y2, Y3 is equal to the gear ratio ρ1 of the first planetary gear set 24; and in the stepwise speed change portion 20, a distance between two vertical lines Y corresponding to the sun gear S and the carrier CA of each of the second, third, and fourth planetary gear sets 26, 28, 30 is equal to 1 (one), and a distance between the carrier CA and the ring gear R of the each planetary gear set 26, 28, 30 is equal to the gear ratio ρ of the each planetary gear set 26, 28, 30.

Thus, the collinear chart of FIG. 3 indicates that in the power transfer 16 (or the non-step speed change portion 11) of the transmission system 10, the first rotary element RE1 (i.e., the first carrier CA1) of the first planetary gear set 24 is directly coupled to the input shaft 14, i.e., the engine 8, and is selectively connectable, via the switching clutch C0, to the second rotary element RE2 (i.e., the first sun gear S1); the second rotary element RE2 is connected to the first electric motor M1, and is selectively connectable, via the switching brake B0, to the case 12; the third rotary element RE3 (i.e., the first ring gear R1) is connected to the transmission member 18 and the second electric motor M2, so that the rotary motion (i.e., rotation) of the input shaft 14 is transmitted (i.e., inputted) via the transmission member 18 to the stepwise speed change portion 20. An oblique straight line L0 passing through a point of intersection of the two lines Y2, X2 represents a relationship between the respective rotation speeds of the first sun gear S1 and the first ring gear R1.

For example, in the state in which both the switching clutch C0 and the switching brake B0 are released so that the power transfer 16 is switched to the non-step speed change state (i.e., the differential state), if the rotation speed of the first sun gear S1, indicated by an intersection point of the straight line L0 and the vertical line Y1, increases or decreases, the rotation speed of the first ring gear R1, indicated by an intersection point of the straight line L0 and the vertical line Y3, decreases or increases, respectively.

In addition, when the switching clutch C0 is engaged and accordingly the first sun gear S1 and the first carrier CA1 are connected to each other, the power transfer 16 is switched to the first non-differential state in which the above-indicated three elements of the power transfer 16 are rotated altogether as an integral unit. Thus, the straight line L0 coincides with the horizontal line X2, i.e., the transmission member 18 is rotated at the same rotation speed as the rotation speed $N_E$ of the engine 8. Alternatively, when the switching brake B0 is engaged and accordingly the rotation of the first sun gear S1 is stopped, the power transfer 16 is switched to the second non-differential state in which the power transfer 16 functions as a speed-increase gear. Therefore, the straight line L0 takes a state as shown in FIG. 3, and the rotation speed of the first ring gear R1 or the transmission member 18, indicated by an intersection point of the straight line L0 and the vertical line Y3, is inputted to the stepwise speed change portion 20 after being increased from the engine rotation speed $N_E$.

In addition, the collinear chart of FIG. 3 indicates that in the stepwise speed change portion 20, the fourth rotary element RE4 is selectively connectable, via the second clutch C2, to the transmission member 18, and is selectively connectable, via the first brake B1, to the case 12; the fifth rotary element RE5 is selectively connectable, via the second brake B2, to the case 12; the sixth rotary element RE6 is selectively connectable, via the third brake B3, to the case 12; the seventh rotary element RE7 is connectable to the output shaft 22; and the eighth rotary element RE8 is selectively connectable, via the first clutch C1, to the transmission member 18.

As shown in FIG. 3, in the stepwise speed change portion 20, when the first clutch C1 and the third brake B3 are engaged, an intersection point of (A) an oblique straight line L1 passing through an intersection point of (a1) the vertical line Y8 indicating the rotation speed of the eighth rotary element RE8 and (a2) the horizontal line X2, and an intersection point of (a3) the vertical line Y6 indicating the rotation speed of the sixth rotary element RE6 and (a4) the horizontal line X1, and (B) the vertical line Y7 indicating the rotation speed of the seventh rotary element RE7 connected to the output shaft 22, indicates the rotation speed of the output shaft 22 that corresponds to the first speed step $1^{st}$. Likewise, when the first clutch C1 and the second brake B2 are engaged, an intersection point of (C) an oblique straight line L2 and (B) the vertical line Y7 indicating the rotation speed of the seventh rotary element RE7 connected to the output shaft 22, indicates the rotation speed of the output shaft 22 that corresponds to the second speed step $2^{nd}$; when the first clutch C1 and the first brake B1 are engaged, an intersection point of (D) an oblique straight line L3 and (B) the vertical line Y7 indicating the rotation speed of the seventh rotary element RE7 connected to the output shaft 22, indicates the rotation speed of the output shaft 22 that corresponds to the third speed step $3^{rd}$; and when the first clutch C1 and the second clutch C2 are engaged, an intersection point of (E) a horizontal straight line L4 and (B) the vertical line Y7 indicating the rotation speed of the seventh rotary element RE7 connected to the output shaft 22, indicates the rotation speed of the output shaft 22 that corresponds to the fourth speed step $4^{th}$. In each of the first, second, third, and fourth speed steps $1^{st}$, $2^{nd}$, $3^{rd}$, $4^{th}$, since the switching clutch C0 is engaged, the driving power is inputted, at the same rotation speed as the engine rotation speed $N_E$, from the power transfer 16 or the non-step speed change portion 11 to the eighth rotary element RE8. However, when the switching brake B0 is engaged in place of the switching clutch C0, the driving power is inputted, at the rotation speed higher than the engine rotation speed $N_E$, from the non-step speed change portion 11 to the eighth rotary element RE8. Thus, when the first clutch C1, the second clutch C2, and the switching brake B0 are engaged, an intersection point of (F) a horizontal straight line L5 and (B) the vertical line Y7 indicating the rotation speed of the seventh rotary element RE7 connected to the output shaft 22, indicates the rotation speed of the output shaft 22 that corresponds to the fifth speed step $5^{th}$.

Figure 4:
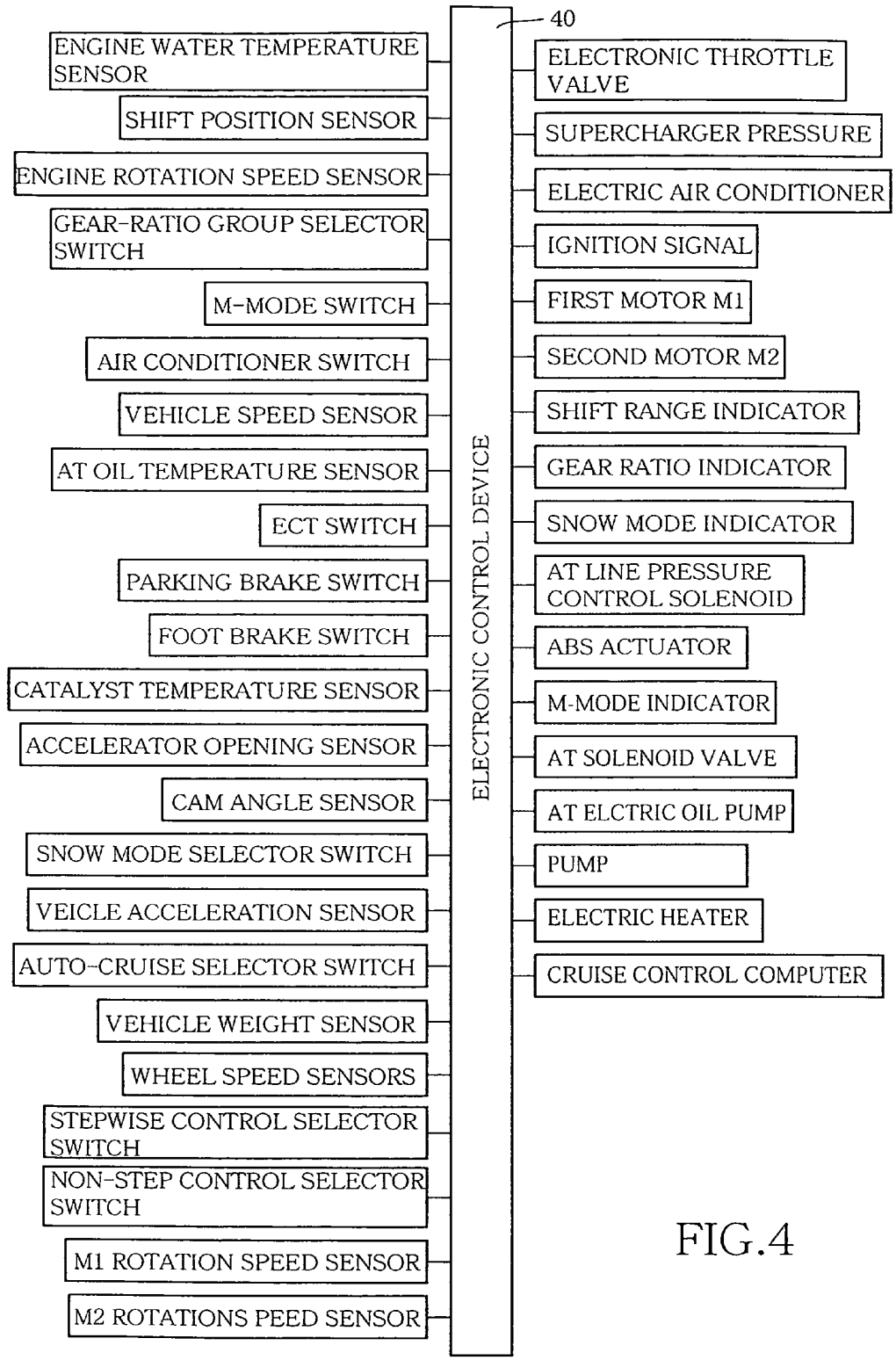
FIG. 4 is a diagrammatic view for explaining input and output signals of an electronic control device of the driving device.
Figure 5:
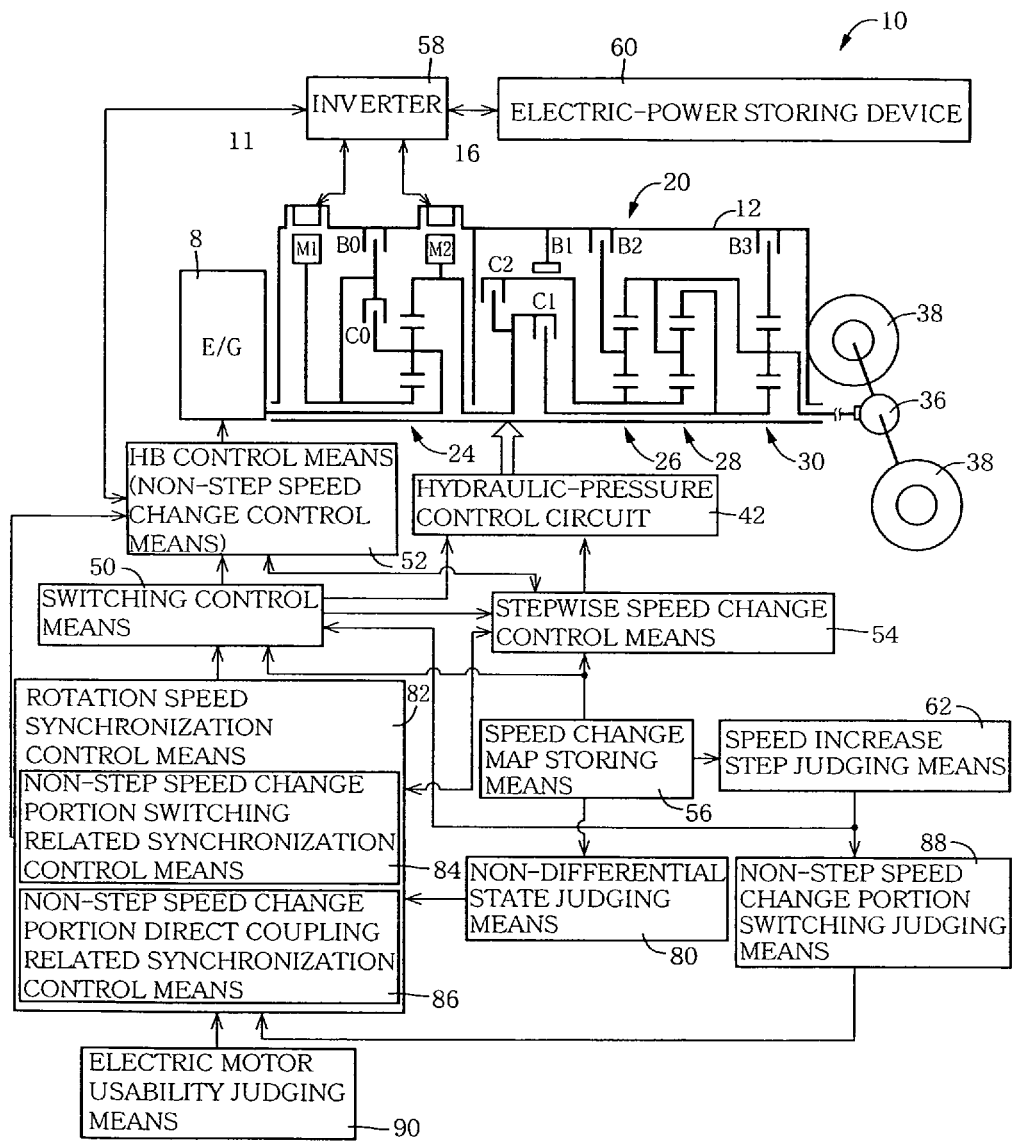
FIG. 5 is a diagrammatic view for explaining various control functions of the control device of FIG. 4.

FIG. 4 shows input signals that are inputted to the electronic control apparatus 40 that controls the transmission system 10; and output signals that are outputted from the control apparatus 40. The control apparatus 40 is essentially constituted by a so-called "microcomputer" including a CPU (central processing unit), a ROM (read only memory), a RAM (random access memory), and an input-and-output (I/O) interface, and processes those signals according to control programs pre-stored in the ROM, while utilizing a temporary storage function of the RAM. Thus, the control apparatus 40 performs a drive control of the transmission system 10, e.g., a hybrid drive control with respect to the electric motors M1, M2, and a speed change control with respect to the stepwise speed change portion 20.

As shown in FIG. 4, the electronic control device 40 receives, from an engine water temperature sensor, a signal representing a temperature of water of the engine 8; receives, from a shift position sensor, a signal representing a shift position; receives, from an engine rotation speed sensor, a signal representing the engine rotation speed $N_E$; receives, from a gear-ratio group selector switch, a signal representing selection of gear-ratio group; receives, from an M-mode switch, a signal commanding an M (motor run) mode; receives, from an air conditioner switch, a signal indicating operation of an electric air conditioner; receives, from a vehicle speed sensor, a vehicle speed signal corresponding to the rotation speed $N_{OUT}$ of the output shaft 22; receives, from an AT oil temperature sensor, an oil temperature signal representing a temperature of a hydraulic oil of the stepwise speed change portion 20; receives, from an ECT switch, an ECT signal; receives, from a parking brake switch, a signal indicating operation of a parking brake; receives, from a foot brake switch, a signal indicating operation of a foot brake; receives, from a catalyst temperature sensor, a signal representing a temperature of a catalyst; receives, from an accelerator opening sensor, an accelerator opening signal Acc representing an amount of operation of an accelerator pedal; receives, from a cam angle sensor, a cam angle signal; receives, from a snow mode selector switch, a snow mode signal indicating selection of a snow mode; receives, from a vehicle acceleration sensor, an acceleration signal representing an acceleration of the vehicle in a longitudinal direction thereof; receives, from an auto-cruise selector switch, an auto-cruise signal indicating selection of an auto-cruise run mode; receives, from a vehicle weight sensor, a vehicle weight signal representing a weight of the vehicle; receives, from a wheel speed sensor, a wheel speed signal representing a rotation speed V of the drive wheels 38; receives, from a stepwise transmission switch, a signal indicating operation thereof to switch the non-step speed change portion 11 to the constant speed change state thereof (i.e., the non-differential state thereof) so as to operate the transmission system 10 as the stepwise variable transmission; receives, from a non-step transmission switch, a signal indicating operation thereof to switch the non-step speed change portion 11 to the non-step speed change state thereof (i.e., the differential state thereof) so as to operate the transmission system 10 as the non-step variable transmission (i.e., the continuously variable transmission CVT); receives, from an M1 rotation speed sensor, a signal representing a rotation speed $N_{M1}$ of the first electric motor M1; and receives, from an M2 rotation speed sensor, a signal representing a rotation speed $N_{M2}$ of the second electric motor M2.

In addition, as shown in FIG. 4, the electronic control device 40 outputs, to an actuator of an electronic throttle valve, a drive signal to adjust a degree of opening of the throttle valve; outputs a supercharger pressure adjust signal to adjust a supercharger pressure; outputs an electric air conditioner drive signal to drive the electric air conditioner; outputs an ignition signal at a timing to ignite the engine 8; outputs a command signal to command operation of the first electric motor M1; outputs a command signal to command operation of the second electric motor M2; outputs a shift position display signal to operate a shift position indicator to display the shift position (i.e., operation position); outputs a gear ratio display signal to operate a gear ratio indicator to display the gear ratio; outputs a snow mode display signal to operate a snow mode indicator to display the snow mode; outputs a signal to control an AT line pressure control solenoid; outputs an ABS operation signal to operate an ABS actuator so as to prevent slippage of the wheels when the vehicle is braked; outputs an M-mode display signal to operate an M-mode indicator to display the M mode; outputs valve operation signals to operate AT solenoid valves of a hydraulic control circuit 42 so as to control respective hydraulic actuators of the hydraulically operated frictional coupling devices of the non-step speed change portion 11 and the stepwise speed change portion 20; outputs a drive signal to operate an AT electric hydraulic pump as a hydraulic pressure source of the hydraulic control circuit 42; outputs a signal to drive an electric heater; and outputs a signal to a cruise control computer.

FIG. 5 is a diagrammatic view for explaining various control functions of the electronic control device 40. In FIG. 5, a stepwise speed change control means or device 54 judges, based on a vehicle state indicated by the vehicle speed V and an output torque $T_{OUT}$ of the stepwise speed change portion 20, whether a speed change control of the transmission system 10 should be performed, according to a speed change map, shown in FIG. 6, that includes solid lines and one-dot chain lines and is pre-stored by a speed change map storing means or device 56. That is, the stepwise speed change control means 54 selects an appropriate one of the speed steps to which the transmission system 10 should be changed or shifted, and performs an automatic speed change control of the stepwise speed change portion 20. More specifically described, the stepwise speed change control means 54 performs the automatic speed change control according to the operation stable shown in FIG. 2, though the control means 54 does not operate the switching clutch C0 or the switching brake B0.

A hybrid (HB) control means or device 52 controls the transmission system 10 to operate in the above-described non-step speed change state, i.e., controls the non-step speed change portion 11 to operate in the differential state, so that the engine 8 operates in a highly efficient operation range. In addition, the hybrid control means 52 changes and optimizes the distribution of driving force between the engine 8 and the second motor M2, and the reaction force resulting from the production of electric power by the first motor M1, so as to control the speed ratio γ0 of the non-step speed change portion 11 operating as the electric CVT, i.e., the non-step variable transmission. For example, the hybrid control means 52 first calculates, based on a current operation amount Acc of the accelerator pedal and a current running speed V of the vehicle, a driver's desired output, subsequently calculates a necessary driving force based on the driver's desired output and a desired value of charged electric power, then calculates an engine rotation speed $N_E$ and a total output, and finally controls, based on the total output and the engine rotation speed $N_E$, the output of the engine 8 and the amount of electric power produced by the first motor M1. In other words, even if the vehicle speed V and the speed ratio of the stepwise speed change portion 20 are not changed, i.e., the rotation speed of the transmission member 18 is not changed, the hybrid control means 52 can control or change the engine rotation speed $N_E$ by controlling or changing the amount of electric power produced by the first motor M1.

The hybrid control means 52 performs its control operation while taking account of the speed step of the stepwise speed change portion 20, for the purpose of improving the driving performance and fuel consumption rate of the vehicle. In this hybrid control, the non-step speed change portion 11 is controlled to function as the electric CVT, so that the engine rotation speed $N_E$ determined to operate the engine 8 in the efficient operation range, e.g., a target engine rotation speed $N_E^*$ matches the rotation speed of the transmission member 18 determined based on the vehicle speed V and the speed step of the stepwise speed change portion 20. More specifically described, the hybrid control means 52 has a pre-stored optimum curve (i.e., a map or a relationship) that is experimentally determined, in advance, in a two-dimensional coordinate system defined by two parameters, i.e., engine rotation speed $N_E$ and engine torque $T_E$, so that when the vehicle runs in a non-step speed change control mode, the driving performance and the fuel consumption rate of the vehicle are compatible with each other. In order to operate the engine 8 according to the pre-stored optimum curve, the hybrid control means 52 determines a target value of the total speed ratio γT of the transmission system 10 so that the engine torque $T_E$ and the engine rotation speed $N_E$ produce an engine output needed to meet a desired driving force, and controls the speed ratio γ0 of the non-step speed change portion 11 so as to obtain the target value of the total speed ratio γT. Thus, the hybrid control means 52 controls or changes the total speed ratio γT in a permitted range in which the total speed ratio γT is permitted to be changed, e.g. a range of from 13 to 0.5.

The hybrid control means 52 supplies the electric energy or power produced by the first motor M1, to an electric-power storage device 62 and the second motor M2 via an inverter 58. Thus, though a main portion of the driving power of the engine 8 is mechanically transmitted to the transmission member 18, a portion of the driving power of the engine 8 is consumed by the first motor M1 to produce the electric energy, i.e., is converted into the electric power. Thus, the electric power produced by the first motor M1 is first supplied via the inverter 58 to the second or first motor M2, M1 and is subsequently supplied from the second or first motor M2, M1 to the transmission member 18. All elements that are related to the production of the electric power, the supplying of the same, and the consumption of the same by the second motor M2 cooperate with each other to constitute an electric path that begins with the conversion of the portion of the driving power of the engine 8 into the electric power and ends with the conversion of the electric power into mechanical power. In addition, even if the engine 8 may be in a stopped state or an idling state, the hybrid control means 52 can run the vehicle by operating the non-step speed change portion 11 as the electric CVT and additionally operating only the electric motor or motors, e.g., the second motor M2 as a power source.

In the present embodiment, the non-step speed change portion 11 can be switched to the non-differential state (i.e., the constant speed change state) in which the portion 11 constitutes a portion of a mechanical power transmission path. In the non-differential state, it is not needed to operate the first motor M1 as the electric power generator or thereby produce a reaction torque, and accordingly the hybrid control means 52 operates the first motor M1 as just the electric motor. In particular, in one of the two constant speed change states of the non-step speed change portion 11, i.e., the first non-differential state in which the first through third rotary elements RE1 through RE3 are rotated as the integral unit, the hybrid control means 52 operates the first motor M1, either solely or in combination with the second motor M2, so that the rotation speed of the first through third rotary elements RE1 through RE3, i.e., the engine rotation speed $N_E$ can be controlled with the rotation speed of the first and/or second motors M1, M2. However, in the stepwise speed change state of the non-step speed change portion 11, the second rotary element RE2 (i.e., the first sun gear S1) of the power transfer 16 is influenced by the vehicle speed V, and accordingly a rate of change per unit time of the engine rotation speed $N_E$ is smaller than that of the same $N_E$ in the non-step speed change state of the non-step speed change portion 11.

Figure 6:
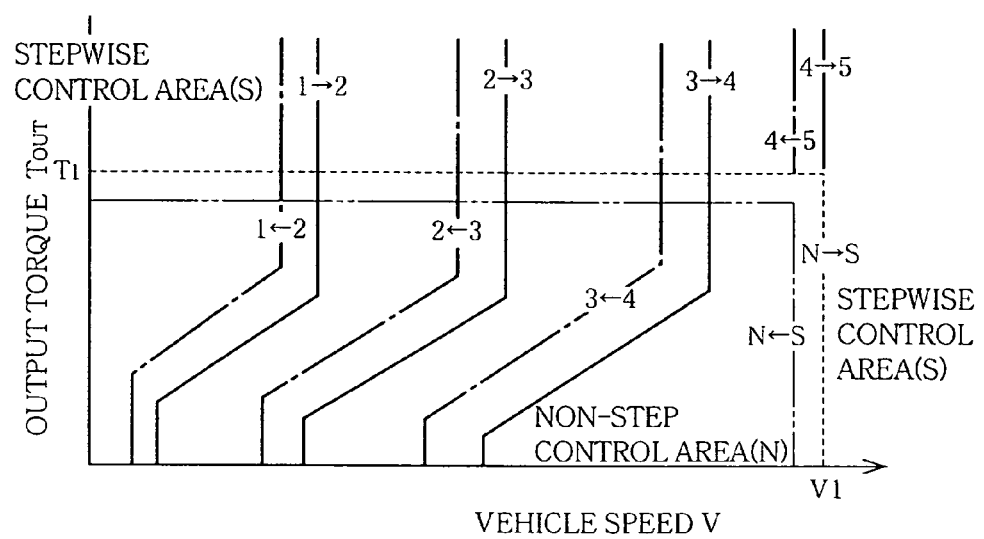
FIG. 6 is a view showing a relationship between (A) a pre-stored speed change map which is prepared in a two-dimensional coordinate system defined by two parameters, i.e., vehicle speed and output torque and according to which a speed step to which a stepwise speed change portion of the transmission system is shifted is selected, and (B) a pre-stored state switch map which is prepared in the same two-dimensional coordinate system and according to which a speed change state to which the transmission system is switched is selected.

A speed increase step judging means or device 62 judges, based on the vehicle state and according to the speed change map of FIG. 6 pre-stored by the speed change map storing means 56, whether the speed step to which the transmission system 10 should be changed is a speed increase step, e.g., the fifth speed step $5^{th}$, for the purpose of judging which one of the switching clutch C0 and the switching brake B0 should be engaged when the transmission system 10 is switched to the stepwise speed change state or when the system 10 is already in the stepwise speed change state.

A switching control means or device 50 judges, based on the vehicle state (i.e., the vehicle speed V and the output torque $T_{OUT}$) and according to a state switch map (i.e., a relationship) indicated at a broken line and a two-dot chain line in FIG. 6 and pre-stored by the speed change map storing means 56, to which one of the non-step speed change state and the stepwise speed change state the transmission system 10 should be switched, that is, in which one of (a) a non-step speed change control area in which the system 10 should be switched to the non-step speed change state and (b) a stepwise speed change control area in which the system 10 should be switched to the stepwise speed change state the vehicle state is. Thus, the switching control means 50 selectively switches the transmission system 10 to the non-step speed change state or the stepwise speed change state.

More specifically described, when the switching control means 50 judges that the vehicle state is in the stepwise speed change control area, the switching control means 50 outputs, to the hybrid control means 52, a signal not to permit, i.e., a signal to inhibit, the hybrid control means 52 from performing the hybrid control or the non-step speed change control, and outputs, to the stepwise speed change control means 54, a signal to permit the stepwise speed change control means 54 to perform a pre-set speed change control corresponding to the stepwise speed change state of the transmission system 10. More specifically described, the stepwise speed change control means 54 performs the automatic speed change control of the stepwise speed change portion 20, according to the speed change map of FIG. 6 pre-stored by the speed change map storing means 56. FIG. 2 shows the combinations of respective operating states of the hydraulically operated frictional coupling devices, i.e., the clutches C0, C1, C2 and the brakes B0, B1, B2, B3 an appropriate one or ones of which is or are selected in the automatic speed change control. In short, the transmission system 10 as a whole, i.e. the non-step speed change portion 11 and the stepwise speed change portion 12 cooperate with each other to function as the so-called "stepwise automatic transmission" that establishes an appropriate one of the speed steps according to the operation table of FIG. 2.

For example, when the speed increase step judging means 62 judges or selects the fifth speed step $5^{th}$, the switching control means 50 outputs, to the hydraulic pressure control circuit 42, a command to cause the switching clutch C0 to be released and cause the switching brake B0 to be engaged, so that the non-step speed change portion 11 operates as an auxiliary transmission whose speed ratio γ0 is fixed at, e.g., 0.7. Thus, the transmission system 10 as a whole establishes a so-called "overdrive speed step", i.e., a speed increase step whose speed ratio is smaller than 1.0. On the other hand, when the speed increase step judging means 62 does not judge or select the fifth speed step $5^{th}$, the switching control means 50 outputs, to the hydraulic pressure control circuit 42, a command to cause the switching clutch C0 to be engaged and cause the switching brake B0 to be disengaged, so that the non-step speed change portion 11 operates as an auxiliary transmission whose speed ratio γ0 is fixed at, e.g., 1. Thus, the transmission system 10 as a whole establishes a speed decrease step whose speed ratio is not smaller than 1.0. In short, the switching control means 50 switches the transmission system 10 to the stepwise speed change state and, in the stepwise speed change state, the non-step speed change portion 11 operates as the auxiliary transmission whose speed ratio γ0 can be selectively switched or changed between the two values corresponding to the two speed steps, and the stepwise speed change portion 20 connected in series to the non-step speed change portion 11 operates as the stepwise variable transmission. Thus, the transmission system 10 as a whole functions as the so-called "stepwise automatic transmission".

On the other hand, when the switching control means 50 judges that the vehicle state falls in the non-step speed change control area in which the transmission system 10 should be switched to the non-step speed change state, the switching control means 50 outputs, to the hydraulic pressure control circuit 42, a command to cause the switching clutch C0 and the switching brake B0 to be disengaged, so that the non-step speed change portion 11 is switched to the non-step speed change state, i.e., is permitted to change continuously the rotation speed. Simultaneously, the switching control means 50 outputs, to the hybrid control means 52, a signal to permit the hybrid control means 52 to perform the hybrid control, and outputs, to the stepwise speed change control means 54, a signal to cause the stepwise speed change control means 54 to be fixed at a pre-set speed step corresponding to the non-step speed change state of the transmission system 10, or a signal to permit the stepwise speed change control means 54 to perform the automatic speed change control of the stepwise speed change portion 20 according to the speed change map of FIG. 6 pre-stored by the speed change map storing means 56. In this case, the stepwise speed change control means 54 performs the automatic speed change control according to the operation stable of FIG. 2, though the control means 54 does not operate the switching clutch C0 or the switching brake B0. In short, the switching control means 50 switches the non-step speed change portion 11 to the non-step speed change state, so that the non-step speed change portion 11 functions as the continuously variable transmission, and the stepwise speed change portion 20 connected in series to the non-step speed change portion 11 functions as the stepwise variable transmission. Thus, an appropriate driving force is obtained. In addition, since the rotation speed inputted to the stepwise speed change portion 20, i.e., the rotation speed of the transmission member 18 can be continuously changed in each of the first, second, third, and fourth speed steps $1^{st}$, $2^{nd}$, $3^{rd}$, $4^{th}$ of the portion 20, the speed ratio of each speed step can also be continuously changed. Since the speed ratio of each of the speed steps can be continuously changed, i.e., the speed ratio can be continuously changed between each pair of adjacent speed steps, the transmission system 10 as a whole can be switched to the non-step speed change state in which the total speed ratio γT is continuously changed.

Here, the graph shown in FIG. 6 is explained in detail. The graph of FIG. 6 shows the speed change map (i.e., the relationship), pre-stored by the speed change map storing means 56, that is used to select an appropriate one of the speed steps of the stepwise speed change portion 20. The pre-stored speed change map is an example of a speed change map that is determined or prepared in a two-dimensional coordinate system defined by two parameters, i.e., vehicle speed V, and output torque $T_{OUT}$ as a sort of driving-force-related parameter. In FIG. 6, solid lines indicate shift-up operations and one-dot chain lines indicate shift-down operations. In addition, in FIG. 6, two broken lines indicate a reference vehicle speed V1 and a reference output torque T1 that are used by the switching control means 50 in judging whether the vehicle state is in the stepwise speed change control area or the non-step speed change control area. More specifically described, the first broken line in FIG. 6 is a high vehicle speed judgment line as a set of points each indicating the reference vehicle speed V1 as a high vehicle speed judgment value pre-set to judge whether the hybrid vehicle is running at a high speed; and the second broken line is a high output run judgment line as a set of points each indicating the reference output torque T1 as a high output run judgment value pre-set to judge whether the hybrid vehicle is running at a high value of the output torque $T_{OUT}$ of the stepwise speed change portion 20 as a sort of driving-force-related parameter that is related to the driving force of the vehicle. Moreover, in FIG. 6, two two-dot chain lines indicate respective hystereses of the two broken lines that are used in judging whether the vehicle state is in the stepwise speed change control area or the non-step speed change control area. Thus, FIG. 6 shows the pre-stored state switch map (i.e., a relationship) that includes the reference vehicle speed V1 and the reference output torque T1 and is used by the switching control means 50 in judging, based on the two parameters, i.e., vehicle speed V and output torque $T_{out}$, whether the vehicle state is in the stepwise speed change control area or the non-step speed change control area. This state switch map may be stored as an integral portion of the speed change map by the speed change map storing means 56. In addition, this state switch map may be so modified as to include only one of the reference vehicle speed V1 and the reference output torque T1, or may be so modified as to employ, as a parameter, only one of the vehicle speed V and the output torque $T_{OUT}$.

In place of the speed change map and/or the state switch map, a judgment mathematic formula used for comparing an actual vehicle wheel V with the reference vehicle speed V1, and/or a judgment mathematic formula used for comparing an actual output torque $T_{OUT}$ with the reference output torque T1 may be pre-stored by the speed change map storing means 56. In this case, for example, when the actual vehicle speed V as the vehicle state is higher than the reference vehicle speed V1, the switching control means 50 switches the transmission system 10 to the stepwise speed change state. Alternatively, for example, when the actual output torque $T_{OUT}$ of the stepwise speed change portion 20 as the vehicle state is greater than the reference output torque T1, the switching control means 50 switches the transmission system 10 to the stepwise speed change state. The switching control means 50 may be adapted such that when electric control devices, such as one or more electric motors, to operate the non-step speed change portion 11 as the electric CVT fail or the performance thereof lowers, for example, when the performance of electric devices related to the electric path starting with the production of electric energy by the first electric motor M1 and ending with the conversion of the electric energy to the mechanical energy, lowers, that is, when the first electric motor M1, the second electric motor M2, the inverter 58, the storage device 60, and the transmission path connecting those elements M1, M2, 58, 60 with each other fail, or the performance of the elements M1, M2, 58, 60 and the transmission path lowers or is lost because of, e.g., aged deterioration such as failures or low temperature, the switching control means 50 switches, with priority, the transmission system 10 to the stepwise speed change state.

The above-described driving-force-related parameter corresponds, one by one, to the driving force of the vehicle, and may be not only a driving torque or force inputted to the drive wheels 38, but also, e.g., an actual value of the output torque $T_{OUT}$ of the stepwise speed change portion 20, an engine torque $T_E$, a vehicle acceleration, or an engine torque $T_E$ calculated based on, e.g., an accelerator opening or a throttle opening (or an intake air amount, an air fuel ratio, or a fuel oil consumption) and the engine rotation speed $N_E$, or an estimated value of a desired driving force calculated based on an amount of operation of the accelerator pedal by the driver, or the throttle opening. The above-described driving torque may be calculated from, e.g., the output torque $T_{OUT}$ while taking account of, e.g., a differential ratio, or a radius of the drive wheels 38, or may be directly detected by, e.g., a torque sensor. These are true with the above-described other sorts of torques.

In addition, for example, the reference vehicle speed V1 is pre-set such that if the transmission system 10 is switched to the non-step speed change stage, when the vehicle is running at a considerably high speed but the fuel consumption rate is worsened at that speed, then the transmission system 10 is not switched to the non-step speed change stage, i.e., remains in the stepwise speed change stage at that speed. Moreover, the reference output torque T1 is so pre-set as to correspond to, e.g. such a characteristic of the first motor M1 that the motor M1 can be so disposed as to output, as a maximum electric-energy output thereof, a small electric energy, for the purpose of reducing the size of the motor M1 without causing the reaction torque of the motor M1 to follow the output of the engine 8 up to a high output range thereof when the vehicle is running at a high output.

Figure 7:
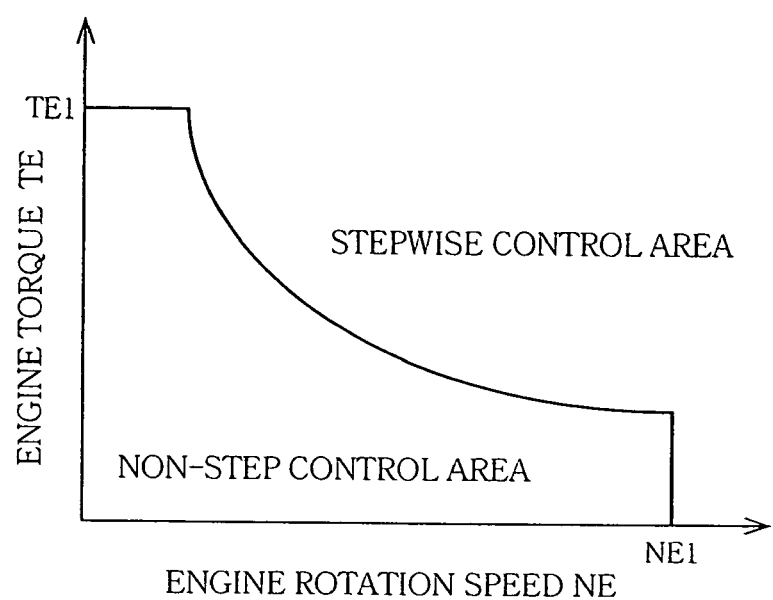
FIG. 7 is a view showing a pre-stored relationship which includes a boundary line between a non-step control area and a stepwise control area and which is used as a basis in preparing a boundary (indicated at broken line) between a non-step control area and a stepwise control area of the state switch map of FIG. 6.

FIG. 7 shows another state switch map (i.e., another relationship) that may be pre-stored by the speed change map storing means 56. This state switch map shows an engine output line as a boundary line that is used by the switching control means 50 in judging whether the current vehicle state indicated by two parameters, i.e., engine rotation speed $N_E$ and engine torque $T_E$ is in the stepwise speed change control area or in the non-step speed change control area. The switching control means 50 may use, in place of the state change map shown in FIG. 6, the state change map shown in FIG. 7, in judging whether the vehicle state indicated by the engine rotation speed $N_E$ and the engine torque $T_E$ is in the stepwise speed change control area or in the non-step speed change control area. The state switch map of FIG. 7 is used as a basis to determine the broken lines shown in FIG. 6. In other words, the broken lines of FIG. 6 are obtained by converting the state switch map (or the relationship) shown in FIG. 7 into the state switch map drawn in the two-dimensional coordinate system defined by the two parameters, i.e., vehicle speed V and output torque $T_{OUT}$.

In the relationship shown in FIG. 6, the stepwise speed change control area (abbreviated to the stepwise control area (S)) is defined as a high torque area not lower than the pre-set reference output torque T1, or a high vehicle speed area not lower than the pre-set reference vehicle speed V1. Thus, the stepwise speed change control is performed when the engine 8 is operated at a considerably high driving torque, or when the vehicle is running at a considerably high speed; and the non-step speed change control is performed when the engine 8 is operated at a considerably low driving torque, or when the vehicle is running at a considerably low speed, i.e., when the engine 8 is operated at a service output area. Likewise, in the relationship shown in FIG. 7, the stepwise control area (S) is defined as a high torque area not lower than a pre-set reference engine torque TE1, a high rotation speed area not lower than a pre-set reference engine rotation speed NE1, or a high output area not lower than a pre-set reference engine output calculated based on the engine torque $T_E$ and the engine rotation speed $N_E$. Thus, the stepwise speed change control is performed when the engine 8 is operated at a considerably high torque, a considerably high rotation speed, or a considerably high output; and the non-step speed change control is performed when the engine 8 is operated at a considerably low torque, a considerably low rotation speed, or a considerably low output, i.e., when the engine 8 is operated at a service output area. The boundary between the stepwise speed change control area (S) and the non-step speed change control area (N), shown in FIG. 7, corresponds to a reference high vehicle speed line as a set of points each indicating a reference high vehicle speed, and a reference high vehicle speed line as a set of points each indicating a reference high output.

Figure 8:
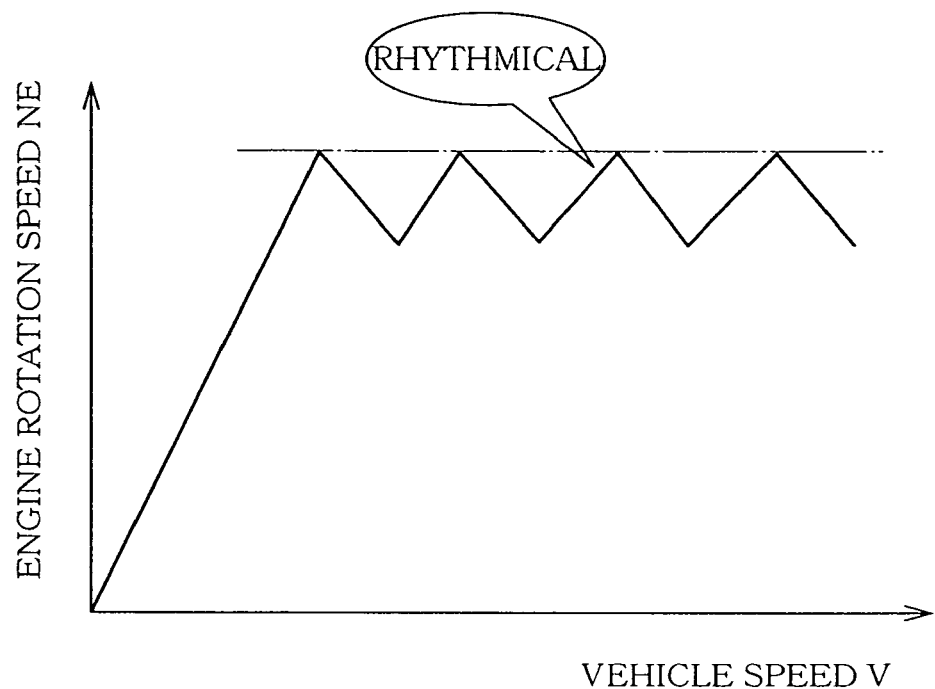
FIG. 8 is a graph showing an example of change of engine rotation speed when the speed steps of the transmission system operating as a stepwise variable transmission are shifted up.

Thus, for example, when the vehicle is running at a low or medium speed or at a low or medium output, the transmission system 10 is controlled to the non-step speed change state, so as to obtain a high fuel consumption rate of the vehicle. However, when the vehicle is running at a high speed, e.g., when the actual vehicle speed V exceeds the reference vehicle speed V1, the transmission system 10 is controlled to the stepwise speed change state in which the system 10 operates as the stepwise variable transmission, so that the output of the engine 8 is transmitted to the drive wheels 38, exclusively via the mechanical power transmission path, while restraining a conversion loss between the driving power and the electric energy that occurs when the system 10 operates as the electric CVT and thereby improving the fuel consumption rate of the vehicle. In addition, when the vehicle is running at a high output, e.g., when the above-described driving-force-related parameter such as the output torque $T_{OUT}$ exceeds the reference output torque T1, the transmission system 10 is controlled to the stepwise speed change state in which the system 10 operates as the stepwise variable transmission, so that the output of the engine 8 is transmitted to the drive wheels 38, exclusively via the mechanical power transmission path. Thus, the transmission system 10 is operated as the electric CVT only when the vehicle is running at the low or medium speed or at the low or medium output. Therefore, a maximum value of the electric energy to be produced by the first motor M1, i.e., the electric energy to be transmitted by the first motor M1 can be reduced, and accordingly the first motor M1, or the vehicle's driving device including the motor M1 can be reduced in size. In other words, it can be said that since the driver's desired driving force is more important than the desired fuel consumption rate when the vehicle is running at the high output, the transmission system 10 is switched to the stepwise speed change state (i.e., the constant speed change state) rather than to the non-step speed change state. Thus, the driver can enjoy rhythmical changes of the engine rotation speed $N_E$, as shown in FIG. 8, that are caused when the speed steps are shifted up in the stepwise automatic speed change state, that is.

Back to FIG. 5, a differential state judging means 80 judges whether the power transfer 16 is in the non-differential state, i.e., whether the non-step speed change portion 11 is in the constant speed change state. For example, the differential state judging means 80 judges whether the non-step speed change portion 11 is in the constant speed change state, by judging whether the vehicle state indicated by the vehicle speed V and the output torque $T_{OUT}$ is in the stepwise speed change control area in which the transmission system 10 is controlled or switched to the stepwise speed change state, according to a state switch map, e.g., the state switch map of FIG. 6 that is used by the switching control means 50 in judging whether the vehicle state is in the stepwise speed change control area in which the transmission system 10 should be switched to the stepwise speed change state so that the vehicle runs in a stepwise speed change control mode, or in the non-step speed change control area in which the transmission system 10 should be switched to the non-step speed change state so that the vehicle runs in a non-step speed change control mode. Thus, the differential state judging means 80 also functions as a stepwise speed change run judging means or device which judges whether the vehicle is running in the stepwise speed change control mode, by judging whether the vehicle state indicated by the vehicle speed V and the output torque $T_{OUT}$ is in the stepwise speed change control area in which the transmission system 10 should be switched to the stepwise speed change state, according to, e.g., the state switch map of FIG. 6.

A rotation speed synchronization control means or device 82 as a rotation speed synchronization controller includes a non-step speed change portion switching related synchronization control means or device 84 and a non-step speed change portion direct coupling related synchronization control means or device 86 and, when the vehicle runs in the stepwise speed change control mode in which the transmission system 10 is under the stepwise speed change control, the rotation speed synchronization control means 82 performs, using the first and/or second motors M1, M2, a synchronization control of the respective rotation speeds of the first, second, and third rotary elements RE1, RE2, RE3 of the power transfer 16, to the respective rotation speeds of the same RE1, RE2, RE3 after the completion of the stepwise speed change control.

As described above, when the vehicle runs in the stepwise speed change control mode in which the transmission system 10 is under the stepwise speed change control, the switching control means 50 causes, as shown in the operation table of FIG. 2, the engaging of the switching clutch C0 in each of the first to fourth speed steps $1^{st}$ through $4^{th}$, and the stepwise speed change control means 54 causes the switching or shifting of the stepwise speed change portion 20 among the first through fourth speed steps $1^{st}$ through $4^{th}$. In the fifth speed step $5^{th}$, the switching control means 50 causes the engaging of the switching brake B0, and the stepwise speed change control means 54 controls the stepwise speed change portion 20 to operate in the same manner as the manner in which the portion 20 operates in the fourth speed step $4^{th}$. Thus, the stepwise speed change control of the transmission system 10 when the vehicle runs in the stepwise speed change control mode is performed by the stepwise speed change portion 20 with respect to among the first through fourth speed steps $1^{st}$ through $4^{th}$, and is performed with respect to between the fourth and fifth speed steps $4^{th}$, $5^{th}$ by the non-step speed change portion 11, i.e., the switching thereof between the first and second non-differential states. And, there have been possibilities that depending upon a timing when the engaging and/or disengaging (releasing) of the hydraulically operated frictional coupling devices C0, C1, C2, B0, B1, B2, B3 are/is performed under the stepwise speed change control of the transmission system 10, a speed change shock may occur to the system 10. Hence, in order to restrain the speed change shock caused by the stepwise speed change control of the transmission system 10 when the vehicle runs in the stepwise speed change control mode, the rotation speed synchronization control means 82 performs the synchronization control of the respective rotation speeds of the first through third rotary elements RE1 through RE3.

When the non-step speed change portion 11 is switched between the first and second non-differential states under the stepwise speed change control of the transmission system 10 during the vehicle's running in the stepwise speed change control mode, that is, when the stepwise speed change control of the transmission system 10 is to switch the system 10 between the fourth and fifth speed steps $4^{th}$, $5^{th}$, the non-step speed change portion switching related synchronization control means 84 temporarily switches the power transfer 16 to the differential state and performs the synchronization control of the respective rotation speeds of the first through third rotary elements RE1 through RE3, owing to the operation of the non-step speed change portion 11 as the electric CVT.

More specifically, when the fourth speed step $4^{th}$ is switched to the fifth speed step $5^{th}$, that is, when the engaging of the switching clutch C0 is replaced with the engaging of the switching brake B0, the non-step speed change portion switching related synchronization control means 84 controls the switching control means 50 to carry out the disengaging of the switching clutch C0, so that the power transfer 16 is temporarily switched to the differential state. When the switching clutch C0 is disengaged, the synchronization control means 84 outputs, to the hybrid control means 52, a command to operate the first motor M1 to produce a reaction torque comparable to the torque with which the switching clutch C0 is engaged, so as to maintain a state similar to the first non-differential state maintained by the engaging of the switching clutch C0. In other words, the synchronization control means 84 controls the hybrid control means 52 to operate the first motor M1 to receive the reaction torque comparable to the engaging torque of the switching clutch C0, and thereby synchronize the rotation speed $N_{M1}$ of the first motor M1 with the engine rotation speed $N_E$, so that even when the switching clutch C0 may be disengaged, the first through third rotary elements RE1 through RE3 are rotated as the integral unit and the state similar to the first non-differential state is maintained. When the first motor M1 receives the reaction torque, the switching clutch C0 does not receive the reaction torque and, even if the switching clutch C0 may be abruptly disengaged, no disengagement shock occurs, or the shock is significantly reduced. Thus, the switching control means 50 can cause the disengaging of the switching clutch C0 by not slowly lowering the hydraulic pressure of the clutch C0 but quickly draining the same.

Subsequently, the non-step speed change portion switching related synchronization control means 84 carries out, owing to the operation of the non-step speed change portion 11 as the electric CVT, the synchronization control of the respective rotation speeds of the first, second, and third rotary elements RE1, RE2, RE3 toward the respective rotation speeds of the same RE1, RE2, RE3 after the completion of the stepwise speed change control from the fourth speed step $4^{th}$ to the fifth speed step $5^{th}$. More specifically described, when the switching brake B0 is engaged, the synchronization control means 84 outputs, to the hybrid control means 52, a command to control the second motor M2 such that in order to establish a state similar to the second non-differential state, the rotation speed $N_{M2}$ of the second motor M2 is forcedly maintained at a rotation speed of the transmission member 18 that is univocally determined based on the vehicle speed V and the speed ratio of the stepwise speed change portion 20 corresponding to the fourth speed step $4^{th}$ (equal to the speed ratio of the portion 20 corresponding to the fifth speed step $5^{th}$), and additionally a command to control the first motor M1 to zero or minimize the relative rotation of the switching brake B0. In addition, after the engaging of the switching brake B0 is completed in the synchronized state, the synchronization control means 84 zeroes the output torque of the first motor M1 so that the reaction torque of the same M1 is transferred to the switching brake B0. During the period of operation of the switching brake B0 from the disengaged state to the engaged state, the first motor M1 receives the reaction torque and the switching brake B0 does not receive the same. Thus, even if the switching control means 50 may cause the engaging of the switching brake B0 by not slowly increasing the hydraulic pressure of the brake B0 but quickly increasing the same, no engagement shock occurs, or the shock can be significantly reduced.

Meanwhile, when the fifth speed step $5^{th}$ is switched to the fourth speed step $4^{th}$, that is, when the engaging of the switching brake B0 is replaced with the engaging of the switching clutch C0, the non-step speed change portion switching related synchronization control means 84 operates in a similar manner. More specifically described, the synchronization control means 84 controls the switching control means 50 to carry out the disengaging of the switching brake B0, so that the power transfer 16 is temporarily switched to the differential state. When the switching brake B0 is disengaged, the synchronization control means 84 outputs, to the hybrid control means 52, a command to operate the first motor M1 to produce a reaction torque comparable to the torque with which the switching brake B0 is engaged, so as to maintain a state similar to the second non-differential state maintained by the engaging of the switching brake B0. In other words, the synchronization control means 84 controls the hybrid control means 52 to operate the first motor M1 to receive the reaction torque comparable to the engaging torque of the switching brake B0, and thereby cause the rotation speed $N_{M1}$ of the first motor M1 to be maintained at substantially zero, so that even when the switching brake B0 may be disengaged, the rotation of the second rotary element RE2 is maintained at substantially zero and the state similar to the second non-differential state is maintained. When the first motor M1 receives the reaction torque, the switching brake B0 does not receive the reaction torque and, even if the switching brake B0 may be abruptly disengaged, no disengagement shock occurs, or the shock is significantly reduced. Thus, the switching control means 50 can cause the disengaging of the switching brake B0 by not slowly lowering the hydraulic pressure of the brake B0 but quickly draining the same.

Subsequently, the non-step speed change portion switching related synchronization control means 84 carries out, owing to the operation of the non-step speed change portion 11 as the electric CVT, the synchronization control of the respective rotation speeds of the first through third rotary elements RE1, RE2, RE3 toward the respective rotation speeds of the same RE1, RE2, RE3 after the completion of the stepwise speed change control from the fifth speed step $5^{th}$ to the fourth speed step $4^{th}$. More specifically described, when the switching clutch C0 is engaged, the synchronization control means 84 outputs, to the hybrid control means 52, a command to control the second motor M2 such that in order to establish the state similar to the first non-differential state, the rotation speed $N_{M2}$ of the second motor M2 is forcedly maintained at the rotation speed of the transmission member 18 that is univocally determined based on the vehicle speed V and the speed ratio of the fourth speed step $4^{th}$ of the stepwise speed change portion 20, and additionally a command to control the first motor M1 to zero or minimize the relative rotation of the switching clutch C0. In addition, after the engaging of the switching clutch C0 is completed in the synchronized state, the synchronization control means 84 zeroes the output torque of the first motor M1 so that the reaction torque of the same M1 is transferred to the switching clutch C0. During the period of operation of the switching clutch C0 from the disengaged state to the engaged state, the first motor M1 receives the reaction torque and the switching clutch C0 does not receive the same. Thus, even if the switching control means 50 may cause the engaging of the switching clutch C0 by not slowly increasing the hydraulic pressure of the clutch C0 but quickly increasing the same, no engagement shock occurs, or the shock can be significantly reduced.

The non-step speed change portion direct coupling related synchronization control means 86 carries out the synchronization control of the respective rotation speeds of the first through third rotary elements RE1 through RE3, as follows: In the case where the switching of the non-step speed change portion 11 between the first and second non-differential states is not performed in the stepwise speed control of the transmission system 10 during the vehicle's running in the stepwise speed change control mode, i.e., in the case where the stepwise speed change control of the transmission system 10 is to switch the system 10 among the first through fourth speed steps $1^{st}$, $2^{nd}$, $3^{rd}$, $4^{th}$ and only the speed change control of the stepwise speed change portion 20 is performed by the stepwise speed change control means 54 in a direct coupling state of the non-step speed change portion 11 in which the switching clutch C0 is engaged and the first through third rotary elements RE1 through RE3 are rotated as the integral unit, the synchronization control means 86 carries out the synchronization control of the respective rotation speeds of the three rotary elements RE1 through RE3, by carrying out the speed change control of the stepwise speed change portion 20 in a state in which the power transfer 16 is in the first non-differential state.

More specifically described, when the transmission system 10 is switched among the first through fourth speed steps $1^{st}$, $2^{nd}$, $3^{rd}$, $4^{th}$, the non-step speed change portion direct coupling related synchronization control means 86 operates the switching control means 50 to maintain the engaging of the switching clutch C0, and operates the stepwise speed change control means 54 to control the stepwise speed change portion 20. In addition, the synchronization control means 86 outputs, to the hybrid control means 52, a command to carry out, using the first and/or second motors M1, M2 in the state in which the power transfer 16 remains in the first non-differential state, the synchronization control of the rotation speed of the first through third rotary elements RE1 through RE3 being rotated as the integral unit, i.e., the rotation speeds of the first and second motors M1, M2, toward a rotation speed of the rotary elements RE1 through RE3 after the completion of the stepwise speed change control. The rotation speed after the completion is univocally determined, during the operation of the stepwise speed change portion 20, based on the vehicle speed V and the speed ratio of the portion 20. In other words, the synchronization control means 86 forcively adjusts, by operating the first and/or second motors M1, M2, the input rotation speed, inputted to the stepwise speed change portion 20, that is otherwise changed in a stepwise manner upon switching of the speed steps of the portion 20, to an input rotation speed inputted to the portion 20 after the completion of the stepwise speed change control, so that a torque transferred when the engaging and/or disengaging of the hydraulically operated frictional coupling devices C2, B1, B2, B3 are/is performed can be lowered and a speed change shock can be restrained.

Thus, the rotation speed synchronization control means 82 selects, for the purpose of appropriately carrying out the synchronization control of the rotation speeds of the first through third rotary elements RE1 through RE3 in the stepwise speed change control of the transmission system 10 during the vehicle's running in the stepwise speed change control mode, one of the non-step speed change portion switching related synchronization control means 84 and the non-step speed change portion direct coupling related synchronization control means 86, i.e., selects one of two different synchronization control methods, by judging whether the switching of the non-step speed change portion 11 between the first and second non-differential states is performed.

Meanwhile, when the non-step speed change portion 11 operates in the constant speed change state, i.e., when the transmission system 10 operates in the stepwise speed change state, the rotation speeds of the first through third rotary elements RE1 through RE3 univocally defines the engine rotation speed $N_E$. More specifically described, when the transmission system 10 operates in the stepwise speed change state, the rotation speeds of the first through third rotary elements RE1 through RE3 correspond, one by one, to the engine rotation speed $N_E$. Therefore, the synchronization control of the rotation speeds of the first through third rotary elements RE1 through RE3 toward the rotation speeds of the same RE1 through RE3 after the completion of the stepwise speed change control, performed by the rotation speed synchronization control means 82 in the stepwise speed change control of the transmission system 10 during the vehicle's running in the stepwise speed change control mode, can be regarded as the synchronization control of the engine rotation speed $N_E$ toward the engine rotation speed $N_E$ after the completion of the stepwise speed change control. In other words, in the present embodiment, the rotation speed synchronization control means 82 carries out, using the first and/or second motors M1, M2, the synchronization control of the engine rotation speed $N_E$ toward the engine rotation speed $N_E$ after the completion of the stepwise speed change control.

A non-step speed change portion switching judging means or device 88 judges whether the stepwise speed change control of the transmission system 10 during the vehicle's running in the stepwise speed change control mode is to switch the system 10 between the fourth and fifth speed steps $4^{th}$, $5^{th}$, by judging, e.g., whether the judgment made by the speed increase step judging means 62 about whether the target speed step is the speed increase step, e.g., the fifth speed step $5^{th}$, has been changed from a positive one to a negative one or vice versa.

An electric motor usability judging means or device 90 judges whether the first and second motors M1, M2 are usable by the hybrid control means 52 in carrying out the synchronization control of the rotation speeds of the first through third rotary elements RE1 through RE3 in the stepwise speed change control of the transmission system 10 during the vehicle's running in the stepwise speed change control mode. For example, the electric motor usability judging means 90 judges whether the first and second motors M1, M2 are usable, by judging whether an electric power supply path to supply the electric power to the electric motors M1, M2, or the motors M1, M2 per se can normally operate, based on an electric conductively of the electric power supply path, or the rotation speeds of the motors M1, M2. Thus, the electric motor usability judging means 90 also functions as an electric motor failure judging means or device which judges whether the motors M1, M2 and/or an electric system related to the same M1, M2 have failed or the performance thereof has lowered.

If the electric motor usability judging means 90 judges that the first and second motors M1, M2 are not usable in the stepwise speed change control of the transmission system 10 during the vehicle's running in the stepwise speed change control mode, for example, judges that the motors M1, M2 per se have failed, the rotation speed synchronization control means 82 carries out the stepwise speed change control of the transmission system 10 during the vehicle's running in the stepwise speed change control mode, by operating, without operating the hybrid control means 52 to carry out the synchronization control of the rotation speeds of the first through third rotary elements RE1 through RE3, the stepwise speed change control means 54 to carry out the operation of the stepwise speed change portion 20, or the switching control means 50 to carry out the switching between the first and second non-differential states, i.e., the switching between the engaging of the switching clutch C0 and the engaging of the switching brake B0.

Figure 9:
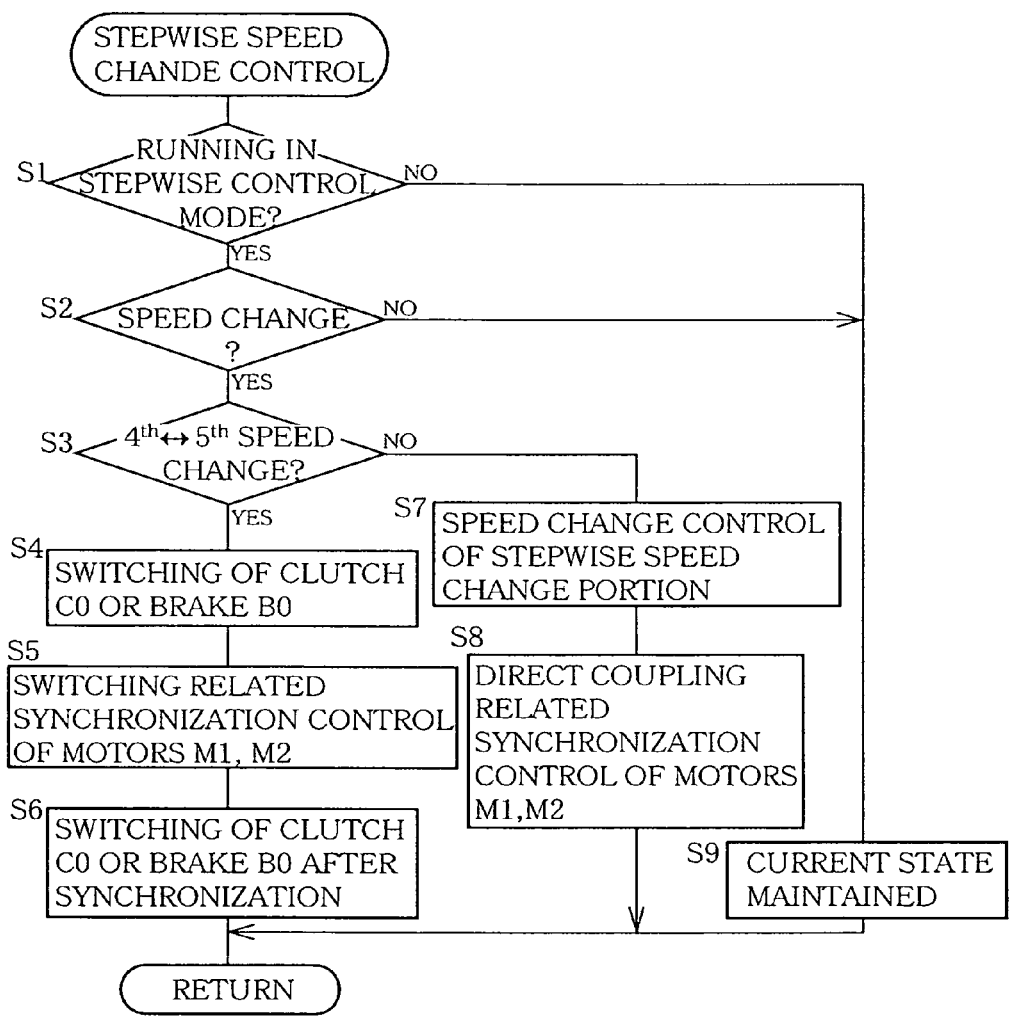
FIG. 9 is a flow chart for explaining a control operation of the control device of FIG. 4, i.e., a rotation speed synchronization control of a first, a second, and a third rotary element of a non-step speed change portion of the transmission system when the vehicle is running in a stepwise speed change mode in which a stepwise speed change control of the transmission system is performed.
Figure 10:
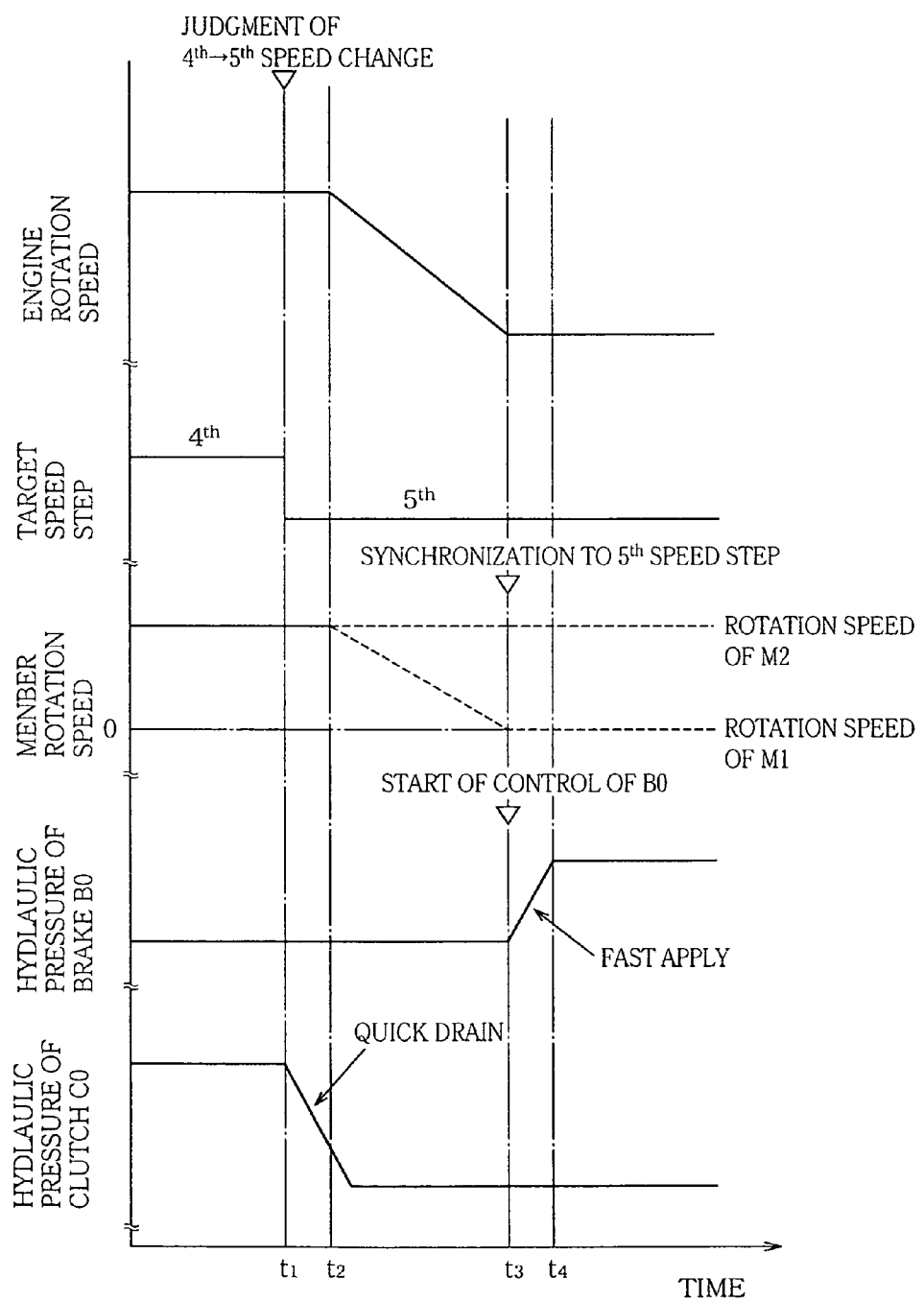
FIG. 10 is a time chart for explaining the control operation represented by the flow chart of FIG. 9, in particular, a control operation to shift up a fourth speed step $4^{th}$ to a fifth speed step $5^{th}$ when the vehicle is running in the stepwise speed change mode.
Figure 11:
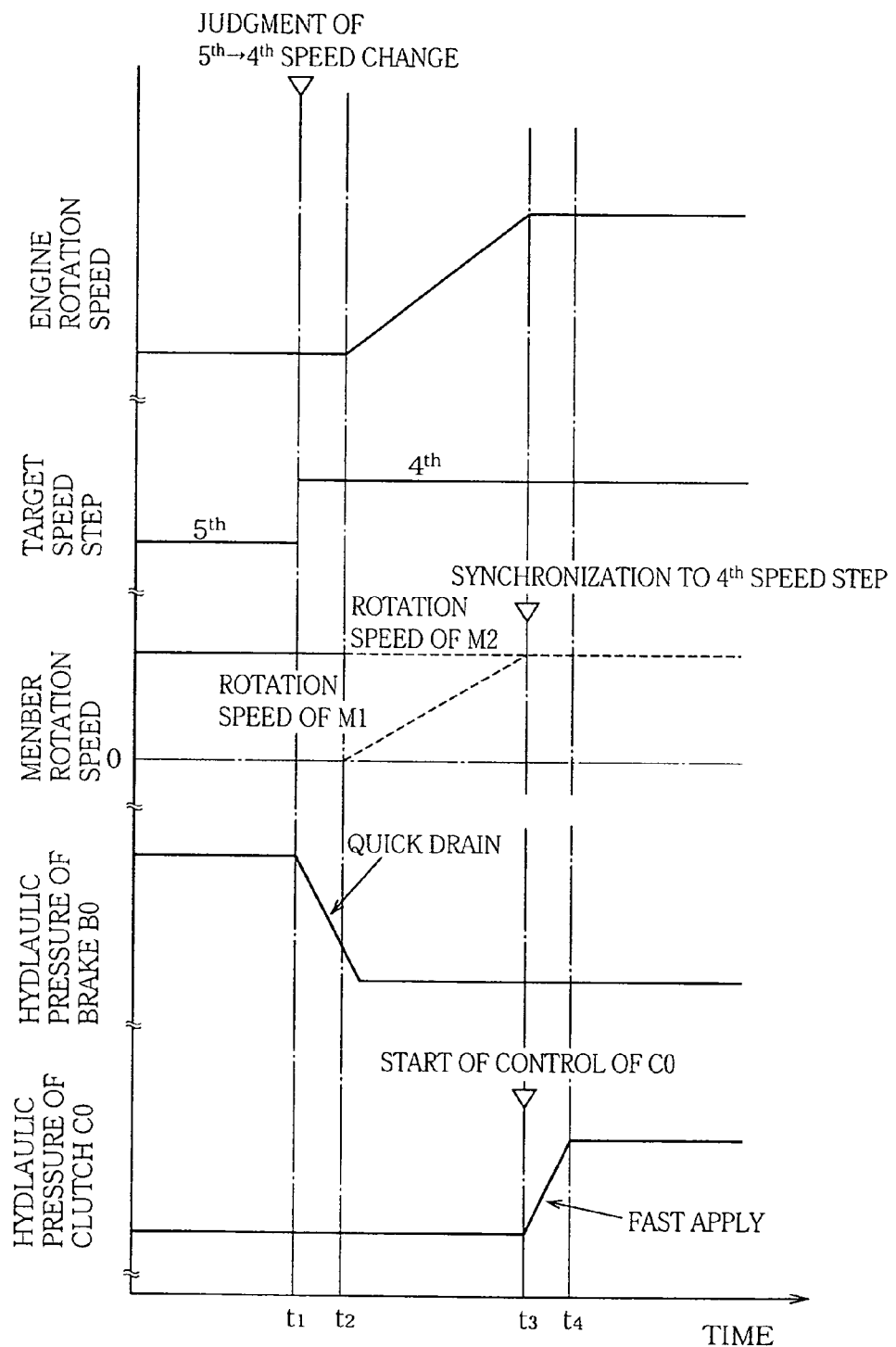
FIG. 11 is a time chart for explaining the control operation represented by the flow chart of FIG. 9, in particular, a control operation to shift down a fifth speed step $5^{th}$ to a fourth speed step $4^{th}$ when the vehicle is running in the stepwise speed change mode.
Figure 12:
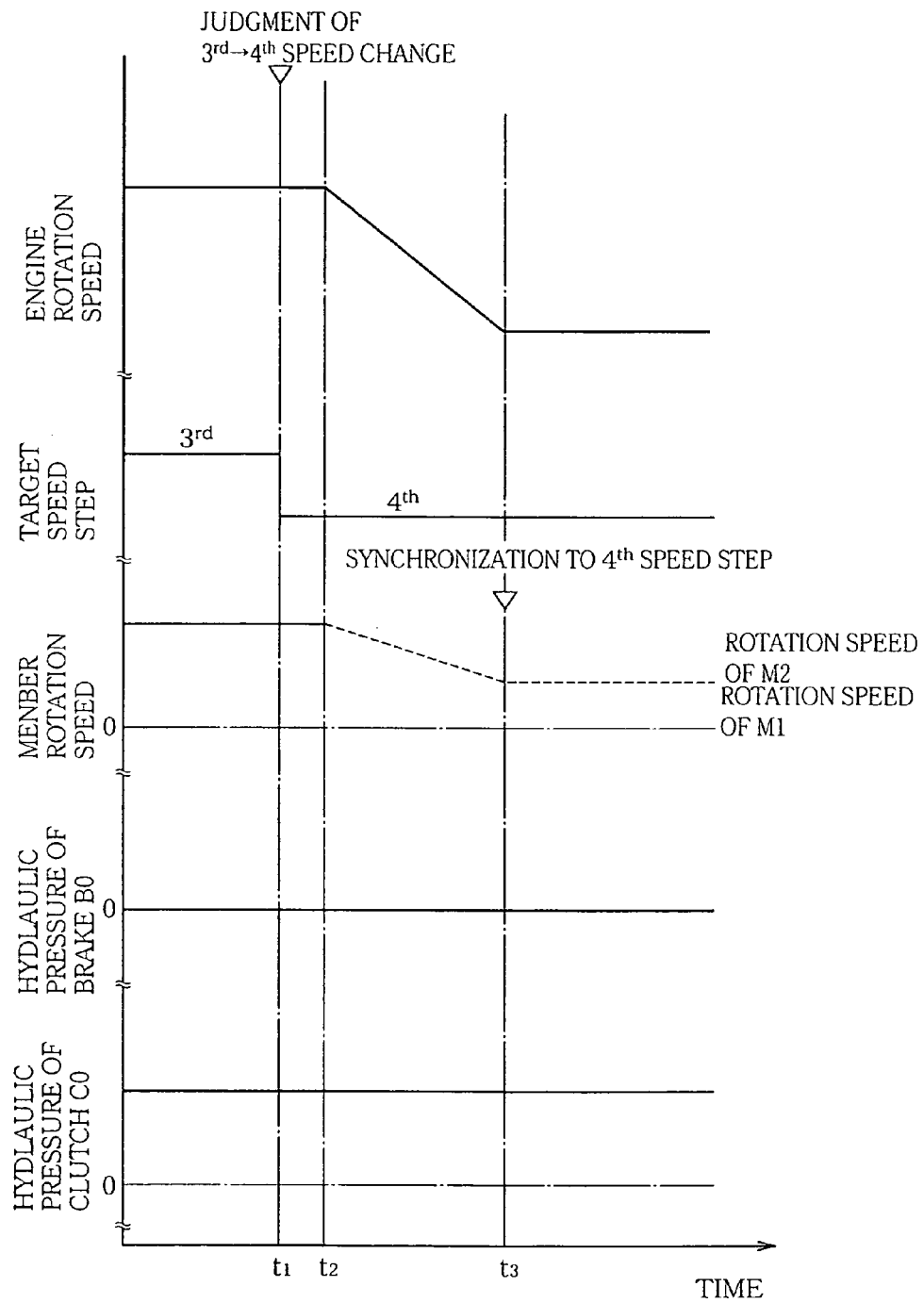
FIG. 12 is a time chart for explaining the control operation represented by the flow chart of FIG. 9, in particular, a control operation to shift up a fourth speed step $3^{rd}$ to a fourth speed step $4^{th}$ when the vehicle is running in the stepwise speed change mode.
Figure 13:
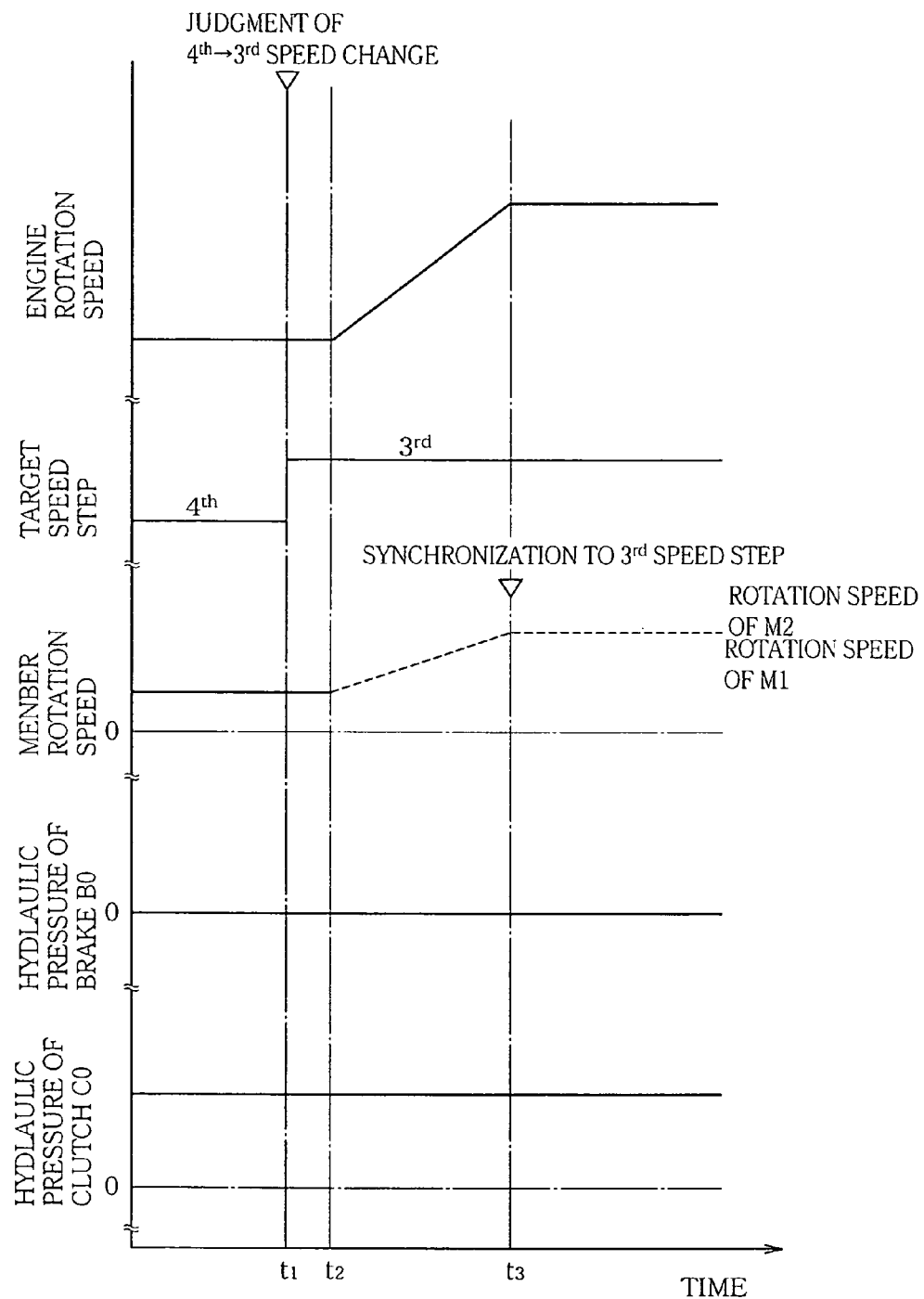
FIG. 13 is a time chart for explaining the control operation represented by the flow chart of FIG. 9, in particular, a control operation to shift down a fourth speed step $4^{th}$ to a third speed step $3^{rd}$ when the vehicle is running in the stepwise speed change mode.

FIG. 9 is a flow chart representing a pertinent portion of the control operations of the electronic control device 40, i.e., a control operation for carrying out the synchronization control of the rotation speeds of the first, second and third rotary elements RE1, RE2, RE3 of the non-step speed change portion 11 in the stepwise speed change control of the transmission system 10 during the vehicle's running in the stepwise speed change control mode. The control operation according to the flow chart is repeated at a very short cycle time such as from several milliseconds to several tens of milliseconds. FIGS. 10, 11, 12, and 13 show respective time charts for explaining respective control operations each according to the flow chart of FIG. 9. More specifically described, FIG. 10 shows a control operation that is performed when the fourth speed step $4^{th}$ is shifted up to the fifth speed step $5^{th}$; FIG. 11 shows a control operation that is performed when the fifth speed step $5^{th}$ is shifted down to the fourth speed step $4^{th}$; FIG. 12 shows a control operation that is performed when the third speed step $3^{rd}$ is shifted up to the fourth speed step $4^{th}$; and FIG. 13 shows a control operation that is performed when the fourth speed step $4^{th}$ is shifted down to the third speed step $3^{rd}$.

First, at Step S1 corresponding to the non-differential-state judging means 80, the control device 40 judges whether the power transfer 16 is in the non-differential state, i.e., whether the vehicle is running in the stepwise speed change control mode. This judgment is made by judging, according to, e.g., the state switch map shown in FIG. 6, whether the vehicle state is in the stepwise speed change control area in which the transmission system 10 should be controlled to the stepwise speed control state so that the vehicle runs in the stepwise speed change control mode. If a negative judgment is made at Step S1, the control of the control device 40 goes to Step S9 to maintain the current running state of the vehicle, and quits the present routine. On the other hand, if a positive judgment is made at Step S1, the control of the control device 40 goes to Step S2 corresponding to the stepwise speed change control means 54. At Step S2, the control device 40 judges whether a speed change control of the transmission system 10 is to be performed, by judging whether a speed step to which the transmission system 10 is to be shifted has been determined or selected based on the vehicle state indicated by the vehicle speed V and the output torque $T_{OUT}$ of the stepwise speed change portion 20, according to, e.g. the speed change map shown in FIG. 6.

If a negative judgment is made at Step S2, the control goes to Step S9 to maintain the current running state of the vehicle, and quits the present routine. On the other hand, if a positive judgment is made at Step S2, the control goes to Step S3 corresponding to the non-step speed change portion switching judging means 88. At Step S3, the control device 40 judges whether the speed change control of the transmission system 10, selected at Step S2, is to shift the system 10 between the fourth and fifth speed steps $4^{th}$, $5^{th}$. This judgment is made by judging, e.g., whether the judgment made by the speed increase step judging means 62 about whether the fifth speed step $5^{th}$ has been selected has been changed from a positive one to a negative one, or from a negative one to a positive one. This judgment is made at time $t_1$ shown in each of FIGS. 10 through 13.

If a positive judgment is made at Step S3, the control goes to Step S4 corresponding to the rotation speed synchronization control means 82 (in particular, the non-step speed change portion switching related synchronization control means 84). At Step S4, the control device 40 operates the switching control means 50 to switch temporarily the power transfer 16 to the differential state. For example, when the fourth speed step $4^{th}$ is shifted up to the fifth speed step $5^{th}$, as shown in FIG. 10, the switching control means 50 carries out the disengaging of the switching clutch C0; and when the fifth speed step $5^{th}$ is shifted down to the fourth speed step $4^{th}$, as shown in FIG. 11, the switching control means 50 carries out the disengaging of the switching brake B0. In each case, the power transfer 16 is temporarily switched to the differential state. To this end, the control device 40 outputs, to the hybrid control means 52, the command to operate the first motor M1 to produce the reaction torque equal to the engaging torque with which the switching clutch C0 is engaged, or the engaging torque with which the switching brake B0 is engaged, till the hydraulic pressure is changed to cause the switching clutch C0 or the switching brake B0 to be substantially disengaged. Therefore, the hydraulic pressure applied to the switching clutch C0 or the hydraulic pressure applied to the switching brake B0 is quickly drained by the hydraulic pressure control circuit 42 under the control of the switching control means 50. This operation is performed in a time period between time $t_1$ and time $t_2$ shown in each of FIGS. 10 and 11.

Step S4 is followed by Step S5 corresponding to the non-step speed change portion switching related synchronization control means 84. At Step S4, the control device 40 carries out, owing to the operation of the non-step speed change portion 11 as the electric CVT, the synchronization control of the respective rotation speeds of the first, second, and third rotary elements RE1, RE2, RE3 (i.e., respective rotation speeds of three members) toward the respective rotation speeds of the three rotary elements RE1, RE2, RE3 after the completion of the speed change control of the transmission system 10. For example, as shown in FIG. 10, when the switching brake B0 is engaged, the control device 40 outputs, to the hybrid control means 52, the command to establish the state similar to the second non-differential state, i.e., forcively keep the rotation speed $N_{M2}$ of the second motor M2 at the rotation speed of the transmission member 18 that is univocally determined from the vehicle speed V and the speed ratio of the stepwise speed change portion 20 corresponding to the fourth speed step $4^{th}$, and the command to operate the first motor M1 to zero the relative rotation of the switching brake B0. The relative rotation of the switching brake B0 may be zeroed by a feedback control of the rotation speed of the first sun gear S1, i.e., the rotation speed $N_{M1}$ of the first motor M1 toward zero, so that a difference of respective rotation speeds of the second rotary element RE2 and the case 12 may be zeroed. Owing to this operation, the engine rotation speed $N_E$ is lowered toward the engine rotation speed $N_E$ after the completion of the speed change control, and thus a synchronization control of the engine rotation speed $N_E$ is performed. This operation is performed in a time period between time $t_2$ and time $t_3$ shown in FIG. 10.

Alternatively, as shown in FIG. 11, when the switching clutch C0 is engaged, the control device 40 outputs, to the hybrid control means 52, the command to establish the state similar to the first non-differential state, i.e., forcively maintain the rotation speed $N_{M2}$ of the second motor M2 at the rotation speed of the transmission member 18 that is univocally determined from the vehicle speed V and the speed ratio of the stepwise speed change portion 20 corresponding to the fourth speed step $4^{th}$, and the command to operate the first motor M1 to zero the relative rotation of the switching clutch C0. The relative rotation of the switching clutch C0 may be zeroed by a feedback control of the rotation speed of the first sun gear S1, i.e., the rotation speed $N_{M1}$ of the first motor M1 toward the rotation speed of the transmission member 18 (i.e., the rotation speed $N_{M2}$ of the second motor M2), so that a difference of the respective rotation speeds of the second rotary element RE2 and the transmission member 18 may be zeroed. Owing to this operation, the engine rotation speed $N_E$ is increased toward the engine rotation speed $N_E$ after the completion of the speed change control, and thus a synchronization control of the engine rotation speed $N_E$ is performed. This operation is performed in a time period between time $t_2$ and time $t_3$ shown in FIG. 11.

Step S5 is followed by Step S6 also corresponding to the non-step speed change portion switching related synchronization control means 84. At Step S6, after the synchronization control of the respective rotation speeds of the first, second, and third rotary elements RE1, RE2, RE3 toward the respective rotation speeds of the three rotary elements RE1, RE2, RE3 after the completion of the speed change control, the control device 40 operates the switching control means 50 to apply quickly the hydraulic pressure to the switching clutch C0 or the switching brake B0. This operation is performed in a time period between time $t_3$ and time $t_4$ shown in each of FIGS. 10 and 11.

On the other hand, if a negative judgment is made at Step S3, the control goes to Step S7 corresponding to the rotation speed synchronization control means 82 (in particular, the non-step speed change portion direct coupling related synchronization control means 86). At Step S7, the control device 40 operates the stepwise speed change control means 54 to carry out the speed change control of the stepwise speed change portion 20, as shown in FIGS. 12 and 13. Step S7 is followed by Step S8 corresponding to the non-step speed change portion direct coupling related synchronization control means 86. At Step S8, the control device 40 operates the switching control means 50 to maintain the engaging of the switching clutch C0, and outputs, to the hybrid control means 52, the command to carry out, using the first and/or second motors M1, M2, the synchronization control of the rotation speed of the first through third rotary elements RE1 through RE3 being rotated as the integral unit, i.e., the rotation speed of the first and second motors M1, M2, toward the rotation speed of the three rotary elements RE1 through RE3 after the completion of the speed change control. The rotation speed of the three rotary elements RE1-RE3 after the completion of the speed change control is univocally determined from the vehicle speed V and the speed ratio of the stepwise speed change portion 20 corresponding the current speed change control of the stepwise speed change portion 20. This operation is performed in a time period between time $t_2$ and time $t_3$ shown in each of FIGS. 12 and 13. In this connection, it is noted that a time period between time $t_1$ and time $t_2$ shown in each of FIGS. 12 and 13 indicates a delay of response occurring to the speed change control of the stepwise speed change portion 20. More specifically described, at time $t_1$, the stepwise speed change control means 54 determines or selects the target speed step to which the stepwise speed change portion 20 is to be shifted, and then the control means 54 actually starts shifting the current speed step by carrying out the engaging and/or disengaging of the hydraulically operated frictional coupling device(s) of the portion 20 and, at time $t_2$, the input rotation speed inputted to the portion 20 starts changing.

As is apparent from the foregoing description of the present embodiment, the transmission system 10 is provided with the switching clutch C0 and the switching brake B0, and the power transfer 16 can be selectively switched, owing to the switching clutch C0 and the switching brake B0, to the differential state in which the non-step speed change portion 11 can operate as the electric CVT or to the non-differential state in which the portion 11 cannot operate as the electric CVT. Therefore, in the stepwise speed change control of the transmission system 10 during the vehicle's running in the stepwise speed change control mode, the rotation speed synchronization control means 82 can carry out, using the fist and second electric motors M1, M2, the synchronization control of the respective rotation speeds of the first through third rotary elements RE1 through RE3 of the power transfer 16, toward the respective rotation speeds of the three elements RE1-RE3 after the completion of the stepwise speed change control. Thus, the speed change shock can be restrained.

In addition, in the illustrated embodiment, in the stepwise speed change control of the transmission system 10 during the vehicle's running in the stepwise speed change control mode, the rotation speed synchronization control means 82 can select, based on whether the switching between the first and second non-differential states is to be performed, the appropriate one of the different methods of carrying out the synchronization control of the respective rotation speeds of the first through third rotary elements RE1 through RE3 of the power transfer 16. Thus, the synchronization control of the rotation speeds of the three rotary elements RE1-RE3 is appropriately performed and accordingly the speed change shock can be restrained.

In addition, in the illustrated embodiment, in the stepwise speed change control of the transmission system 10 during the vehicle's running in the stepwise speed change control mode, the rotation speed synchronization control means 82 (in particular, the non-step speed change portion switching related synchronization control means 84) temporarily switches, when the switching between the first and second non-differential states is to be performed, the power transfer 16 to the differential state, and carries out, owing to the operation of the non-step speed change portion 11 as the electric CVT, the synchronization control of the respective rotation speeds of the first through third rotary elements RE1 through RE3. Therefore, even if the respective rotation speeds of the first through third rotary elements RE1 through RE3 may be changed relative to each other by the switching between the first and second non-differential states, the respective rotation speeds of the first through third rotary elements RE1 through RE3 can be quickly controlled to the respective rotation speeds of the three elements RE1-RE3 after the completion of the stepwise speed change control, the latter rotation speeds being univocally determined from the vehicle speed and the speed ratio of the stepwise speed change portion 20.

For example, when the non-differential state is temporarily switched to the differential state, or when the temporary differential state is switched to the non-differential state, the electric motors produce the reaction torque equal to the engagement torque of the switching clutch C0 or the switching brake B0, so that the synchronization control of the rotation speeds of the first through third rotary elements RE1 through RE3 is performed to maintain the state similar to the first or second non-differential state. Since the switching clutch C0 or the switching brake B0 is engaged or disengaged under the synchronization control, no engagement or disengagement shock occurs, or the shock is significantly reduced. In addition, when the switching clutch C0 or the switching brake B0 is engaged, the rotation speed $N_{M2}$ of the second electric motor M2 is forcedly maintained at the rotation speed of the transmission member 18 that is univocally determined from the vehicle speed V and the speed ratio of the stepwise speed change portion 20 corresponding to the fourth speed step $4^{th}$, so that the change of rotation speed of the transmission member 18 when the rotation speed of the second rotary element RE2 (i.e., the first sun gear S1) is changed by the first electric motor M1 toward the rotation speed of the element RE2 after the speed change control can be decreased. Thus, the shock caused by the change of vehicle speed V can be restrained.

In the illustrated embodiment, in the stepwise speed change control of the transmission system 10 during the vehicle's running in the stepwise speed change control mode, the rotation speed synchronization control means 82 (in particular, the non-step speed change portion direct coupling related synchronization control means 86) keeps, when the switching between the first and second non-differential states is not to be performed, the power transfer 16 to the first non-differential state, and carries out the synchronization control of the rotation speeds of the first through third rotary elements RE1 through RE3. Therefore, the rotation speeds of the first through third rotary elements RE1 through RE3 can be quickly controlled or changed to the rotation speeds of the three elements RE1-RE3 after the completion of the stepwise speed change control, the latter rotation speeds being univocally determined from the vehicle speed V and the speed ratio of the stepwise speed change portion 20. Thus, the speed change shock can be restrained.

For example, when the engaging and/or disengaging of the hydraulically operated frictional coupling devices C2, B1, B2, B3 are/is performed in the speed change control of the stepwise speed change portion 20, the first and/or second electric motors M1, M2 forcively change or adjust the input rotation speed, inputted to the stepwise speed change portion 20, to the rotation speed after the completion of the speed change control. Thus, the torque transferred among the hydraulically operated frictional coupling devices is largely reduced and accordingly the speed change shock is significantly restrained.

In the illustrated embodiment, in the stepwise speed change control of the transmission system 10 during the vehicle's running in the stepwise speed change control mode, the rotation speed synchronization control means 82 operates, when the first and second electric motors M1, M2 cannot be used, the stepwise speed change control means 54 to carry out the speed change control of the stepwise speed change portion 20, or operates the switching control means 50 to carry out the switching between the first and second non-differential states. This is a speed change control that has been commonly performed by conventional stepwise variable automatic transmissions, that is, a speed change control in which the engaging and disengaging (i.e., releasing) of the hydraulically operated frictional coupling devices are switched with each other. Thus, the conventional speed change control is performed as a substitute control in the present transmission system 10.

Next, there will be described other embodiments of the present invention. In the following description, the same reference numerals as used in the first embodiment are used to designate the corresponding elements or parts of the additional embodiments, and the description of those elements or parts is omitted.

Second Embodiment

Figures 14, 15:
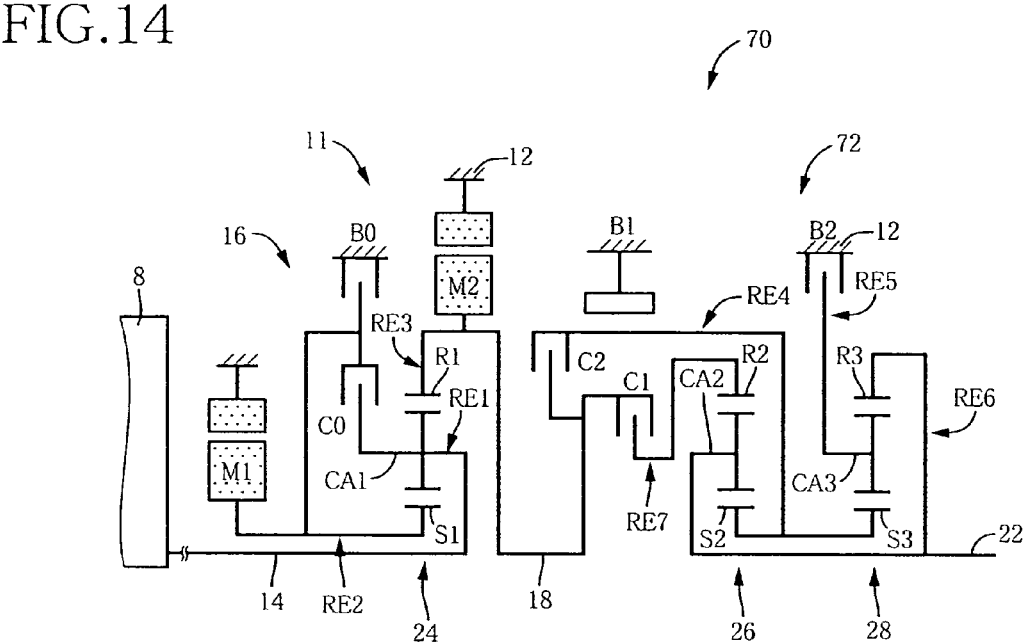
FIG. 14 is a schematic view corresponding to FIG. 1, for explaining a construction of a transmission system as a portion of a driving device of another hybrid vehicle as a second embodiment of the present invention.
FIG. 15 is an operation table corresponding to FIG. 2, representing a relationship between non-step or stepwise speed change operations of the transmission system of FIG. 14, and combinations of respective operating states of hydraulically operated frictional coupling devices that are used to perform those speed change operations, respectively.
Figure 16:
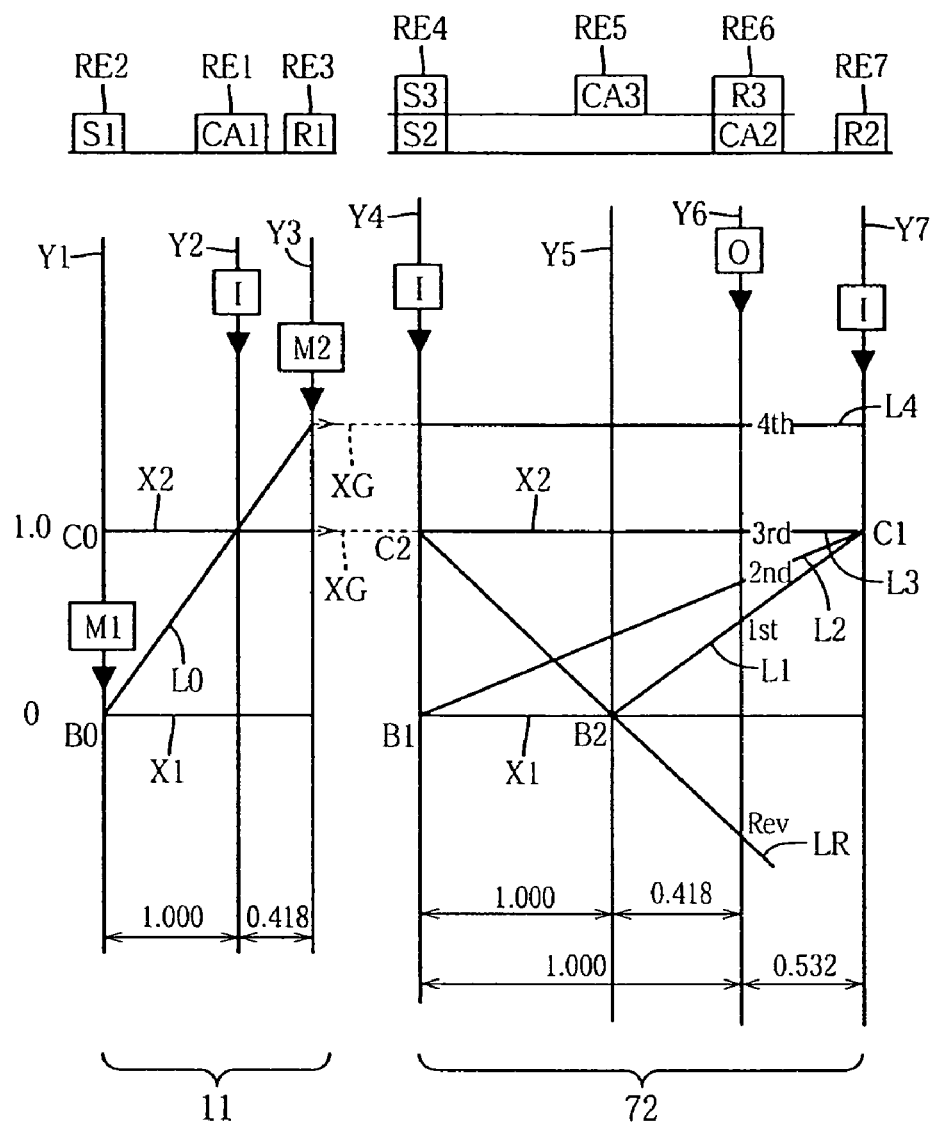
FIG. 16 is a collinear chart corresponding to FIG. 3, for explaining respective relative rotation speeds of seven rotary elements RE1 through RE7 in each of the stepwise speed change operations of the transmission system of FIG. 14.

FIG. 14 is a schematic view for explaining a transmission system 70 constituting a portion of another driving device to which the present invention is applied; FIG. 15 is an operation table representing a relationship between speed steps of the transmission system 70 and corresponding combinations of respective operating states of hydraulically operated frictional coupling devices; and FIG. 16 is a collinear chart for explaining speed change operations of the transmission system 70.

Like the transmission system 10 employed in the first embodiment, the transmission system 70 employed in the present, second embodiment includes the non-step (i.e., continuous) speed change portion 11 including the first electric motor M1, the power transfer 16, and the second electric motor M2. In addition, the transmission system 70 includes a stepwise speed change portion 72 that is provided between the non-step speed change portion 11 and the output shaft 22, is connected, in series, to the non-step speed change portion 11 via the transmission member 18, and has three speed steps. The power transfer 16 includes the single-pinion first planetary gear set 24 having the pre-determined gear ratio $\rho 1$, e.g., about 0.418; the switching clutch C0; and the switching brake B0. The stepwise speed change portion 72 includes a single-pinion second planetary gear set 26 and a single-pinion third planetary gear set 28. The second planetary gear set 26 has a pre-determined gear ratio $\rho 2$, e.g., about 0.532; and the third planetary gear set 28 has a pre-determined gear ratio $\rho 3$, e.g., about 0.418. In the stepwise speed change portion 70, a second sun gear S2 of the second planetary gear set 26 and a third sun gear S3 of the third planetary gear set 28 are integrally connected to each other, are selectively connectable to the transmission member 18 via a second clutch C2, and are selectively connectable to the case 12 via a first brake B1; a second carrier CA2 of the second planetary gear set 26 and a third ring gear R3 of the third planetary gear set 28 are integrally connected to each other and are connected to the output shaft 22; a second ring gear R2 of the second planetary gear set 26 is selectively connectable to the transmission member 18 via a first clutch C1; and a third carriage CA3 of the third planetary gear set 28 is selectively connectable to the case 12 via a second brake B2.

In the transmission system 70 constructed as described above, the switching clutch C0, the first clutch C1, the second clutch C2, the switching brake B0, the first brake B1, and the second brake B2 are selectively engaged or disengaged (i.e., released), as indicated in the operation table shown in FIG. 15, so as to establish selectively an arbitrary one of a first speed step ($1^{st}$), a second speed step ($2^{nd}$), a third speed step ($3^{rd}$), a fourth speed step ($4^{th}$), a reverse speed step (R), and a neutral position (N). Respective speed ratios $\gamma$(=(rotation speed $N_{IN}$ of input shaft 14)/(rotation speed $N_{OUT}$ of output shaft 22)) of the first through fourth speed steps $1^{st}$ through $4^{th}$ change with a substantially same ratio. In the operation table of FIG. 15, symbol "O" indicates an engaged state of each of the clutches C0, C1, C2 and the brakes B1, B2; and symbol "⊚" indicates an engaged state of each of the switching clutch and brake C0, B0 when the non-step speed change portion 11 operates in the constant speed change state in which the portion 11 functions as the transmission whose speed ratio is fixed, and a disengaged (released) state of the same C0, B0 when the portion 11 operates in the non-step speed change state in which the portion 11 functions as the electric CVT. In the present embodiment, the power transfer 16 employs the switching clutch C0 and the switching brake B0 and, when either the switching clutch C0 or the switching brake B0 is engaged, the non-step speed change portion 11 can be selectively switched to the constant speed change state, in place of the non-step speed change state. Therefore, when either the switching clutch C0 or the switching brake B0 is engaged, the transmission system 70 can take a stepwise speed change state in which the non-step speed change portion 11, switched to the constant speed change state, cooperates with the stepwise speed change portion 72 to operate as a stepwise variable transmission; and when neither the switching clutch C0 nor the switching brake B0 is engaged, the transmission system 70 can take a non-step (i.e., continuous) speed change state in which the non-step speed change portion 11, switched to the non-step speed change state, cooperates with the stepwise speed change portion 72 to operate as an electrical CVT. In short, when either the switching clutch C0 or the switching brake B0 is engaged, the transmission system 70 is switched to the stepwise speed change state; and when neither the switching clutch C0 nor the switching brake B0 is engaged, the transmission system 10 is switched to the non-step speed change state.

For example, when the transmission system 70 operates as the stepwise variable transmission, and simultaneously when the switching clutch C0, the first clutch C1 and the second brake B2 are engaged as shown in FIG. 15, the first speed step $1^{st}$ is established in which a maximum value of a speed ratio $\gamma 1$ thereof is equal to, e.g., about 2.804; when the switching clutch C0, the first clutch C1 and the first brake B1 are engaged, the second speed step $2^{nd}$ is established in which a speed ratio $\gamma 2$ thereof is smaller than the speed ratio $\gamma 1$ and is equal to, e.g., about 1.531; when the switching clutch C0, the first clutch C1 and the second clutch C2 are engaged, the third speed step $3^{rd}$ is established in which a speed ratio $\gamma 3$ thereof is smaller than the speed ratio $\gamma 2$ and is equal to, e.g., about 1.000; and when the switching brake B0, the first clutch C1 and the second clutch C2 are engaged, the fourth speed step $4^{th}$ is established in which a speed ratio $\gamma 4$ thereof is smaller than the speed ratio $\gamma 3$ and is equal to, e.g., about 0.705. In addition, when the second clutch C2 and the second brake B2 are engaged, the reverse speed step R is established in which a speed ratio $\gamma R$ thereof is smaller than the speed ratio $\gamma 1$ and greater than the speed ratio $\gamma 2$, and is equal to, e.g., about 2.393. When the neutral position N is established, only the switching clutch C0 is engaged.

On the other hand, when the transmission system 70 operates the electric CVT, both the switching clutch C0 and the switching brake B0 are disengaged (released) as shown in FIG. 15. Thus, the non-step speed change portion 11 operates as the electric CVT, and the stepwise speed change portion 72, connected in series to the portion 11, operates as the stepwise variable transmission. Therefore, when the stepwise speed change portion 70 operates in each one of the three speed steps corresponding to the first speed step $1^{st}$, the second speed step $2^{nd}$, and the third speed step $3^{rd}$, the rotation speed inputted to the portion 70, i.e., the rotation speed of the transmission member 18 can be changed with no steps, i.e., continuously, so that each one of the speed steps has a speed-ratio range in which the speed ratio of the each speed step can be continuously changed. Thus, the speed ratio of the transmission system 70 can be continuously changed between each pair of adjacent speed steps out of the first through fourth speed steps. That is, a total speed ratio $\gamma T$ of the transmission system 70 as a whole can be continuously changed.

Thus, the transmission system 70 includes the non-step speed change portion 11 functioning as a differential portion or a first speed change portion; and the stepwise speed change portion 72 functioning as an automatic speed change portion or a second speed change portion. FIG. 16 shows a collinear chart showing straight lines representing respective relationships among respective relative rotation speeds of first through seventh rotary elements RE1 through RE7, the relationships corresponding the different speed steps in which the rotary elements are connected to each other in different manners. The respective rotation speeds of the first through third rotary elements RE1 through RE3 of the power transfer 16 when both the switching clutch and brake C0, B0 are disengaged or when either the switching clutch or brake C0, B0 is engaged are the same as those of the first through third rotary elements RE1 through RE3 employed in the first embodiment.

In FIG. 16, four vertical lines Y4, Y5, Y6, Y7 correspond to four elements of the stepwise speed change portion 70, respectively. In the order from the left to the right, the fourth vertical line Y4 indicates a relative rotation speed of the second and third sun gears S2, S3 connected to each other and corresponding to a fourth rotary element RE4; the fifth vertical line Y5 indicates a relative rotation speed of the third carrier CA3 corresponding to a fifth rotary element RE5; the sixth vertical line Y6 indicates a relative rotation speed of the second carrier CA2 and the third ring gear R3 connected to each other and corresponding to a sixth rotary element RE6; and the seventh vertical line Y7 indicates a relative rotation speed of the second ring gear R2 corresponding to a seventh rotary element RE7. In the stepwise speed change portion 72, the fourth rotary element RE4 is selectively connectable, via the second clutch C2, to the transmission member 18, and is selectively connectable, via the first brake B1, to the case 12; the fifth rotary element RE5 is selectively connectable, via the second brake B2, to the case 12; the sixth rotary element RE6 is connected to the output shaft 22; and the seventh rotary element RE7 is selectively connectable, via the first clutch C1, to the transmission member 18.

As shown in FIG. 16, in the stepwise speed change portion 72, when the first clutch C1 and the second brake B2 are engaged, an intersection point of (A) an oblique straight line L1 passing through an intersection point of (a1) the vertical line Y7 indicating the rotation speed of the seventh rotary element RE7 (R2) and (a2) the horizontal line X2, and an intersection point of (a3) the vertical line Y5 indicating the rotation speed of the fifth rotary element RE5 and (a4) the horizontal line X1, and (B) the vertical line Y6 indicating the rotation speed of the sixth rotary element RE6 connected to the output shaft 22, indicates the rotation speed of the output shaft 22 that corresponds to the first speed step $1^{st}$. Likewise, when the first clutch C1 and the first brake B1 are engaged, an intersection point of (C) an oblique straight line L2 and (B) the vertical line Y6 indicating the rotation speed of the sixth rotary element RE6 connected to the output shaft 22, indicates the rotation speed of the output shaft 22 that corresponds to the second speed step $2^{nd}$; and when the first clutch C1 and the second clutch C2 are engaged, an intersection point of (D) an oblique straight line L3 and (B) the vertical line Y6 indicating the rotation speed of the sixth rotary element RE6 connected to the output shaft 22, indicates the rotation speed of the output shaft 22 that corresponds to the third speed step $3^{rd}$. In each of the first, second, and third speed steps $1^{st}$, $2^{nd}$, $3^{rd}$, since the switching clutch C0 is engaged, the driving power from the non-step speed change portion 11 is inputted, at the same rotation speed as the engine rotation speed $N_E$, to the seventh rotary element RE7. However, when the switching brake B0 is engaged in place of the switching clutch C0, the driving power from the non-step speed change portion 11 is inputted, at the rotation speed higher than the engine rotation speed $N_E$, to the seventh rotary element RE7. Thus, when the first clutch C1, the second clutch C2, and the switching brake B0 are engaged, an intersection point of (F) a horizontal straight line L4 and (B) the vertical line Y6 indicating the rotation speed of the sixth rotary element RE6 connected to the output shaft 22, indicates the rotation speed of the output shaft 22 that corresponds to the fourth speed step $4^{th}$.

Thus, the present transmission system 70 includes the non-step speed change portion 11 functioning as the differential portion or the first speed change portion, and the stepwise speed change portion 72 functioning as the automatic speed change portion or the second speed change portion. Therefore, the driving device including the transmission system 70 can enjoy the same advantages as the above-described advantages of the driving device including the transmission system 10.

Third Embodiment

Figure 17:
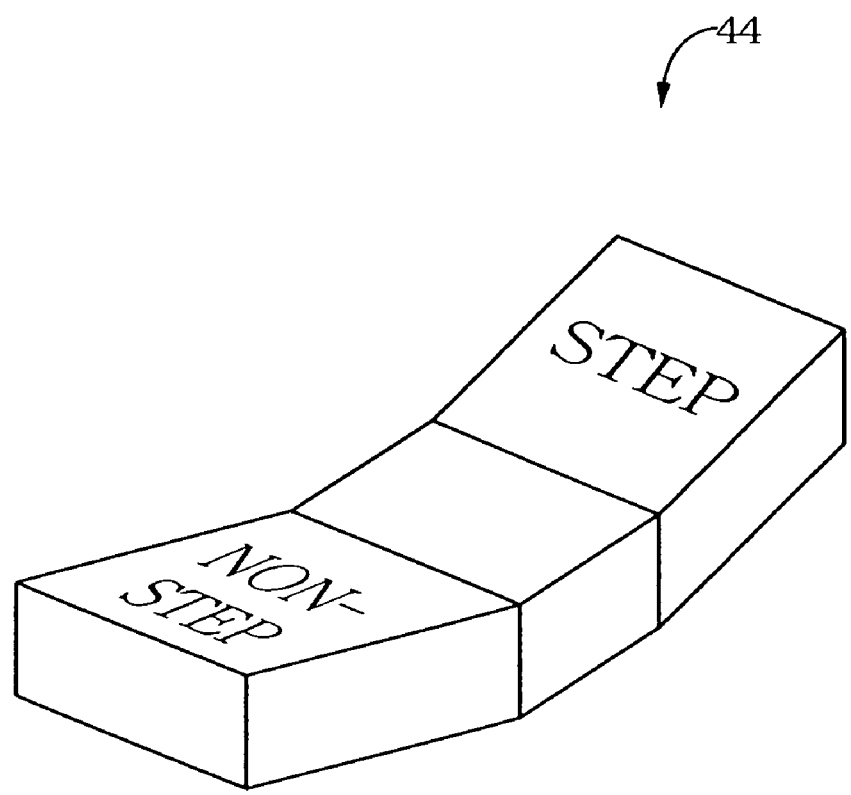
FIG. 17 is a view of a seesaw-type switch as a sort of a switching device that constitutes a portion of a speed change state selecting device that is manually operable by a driver.

FIG. 17 shows a seesaw-type switch 44 (hereinafter, simply referred to as the switch 44) as a portion of a speed change state manual selector that is manually operable by a driver for selectively switching the power transfer 16 to the differential state or to the non-differential state, i.e., the transmission system 10, 70 to the non-step speed change state or the stepwise speed change state. The switch 44 may be provided, in each of the above-described first and second embodiments, in the hybrid vehicle such that the switch 44 is manually operable by the driver. This switch 44 enables the driver to run the vehicle in a desired or selected one of the different speed change control modes. The switch 44 includes a first portion that is labeled "STEP" and corresponds to the stepwise speed change control mode, and a second portion that is labeled "NON-STEP" and corresponds to the non-step speed change control mode. When the driver pushes the first or second portion of the switch 44, the driver can select the non-step speed change control mode in which the transmission system 10, 70 is switched to the non-step speed change state so as to operate as the electric CVT, or the stepwise speed change control mode in which the transmission system 10, 70 is switched to the stepwise speed change state so as to operate as the stepwise variable transmission. In each of the first and second embodiments, the speed change state of the transmission system 10, 70 is automatically switched, based on the change of the vehicle state, according to, e.g., the state switch map shown in FIG. 6 or FIG. 7. In place of, or in addition to, this automatic state switch control mode, the third embodiment employs the manual state switch control mode in which the speed change state of the transmission system 10, 70 is manually switched by the operation of the switch 44. That is, when the switch 44 is manually operated to select an arbitrary one of the non-step speed change state and the stepwise speed change state, the switching control means 50 switches, with priority, the transmission system 10, 70 to the thus selected speed change state. For example, when the driver wants to feel the operation of the electric CVT and/or obtain the fuel consumption rate improving effect, the driver can manually operate the switch 44 to select the non-step speed change state; and when the driver wants to feel the change of the engine rotation speed caused by the speed change control of the stepwise variable transmission, the driver can manually operate the switch 44 to select the stepwise speed change state. The switch 44 may be modified to be able to take selectively a neutral operation position different than two operation positions corresponding to the non-step speed change state and the stepwise speed change state, respectively. In the latter case, when the switch 44 is operated to select the neutral operation position, neither the non-step speed change state nor the stepwise speed change state is selected. Thus, the selection of the neutral operation position indicates that the driver does not want to select either the non-step speed change state nor the stepwise speed change state, i.e., wants to select the automatic state switch control mode.

While the present invention has been described in its preferred embodiments, it is to be understood that the present invention may be otherwise embodied.

For example, at Step S1 of the flow chart of FIG. 9 employed by each of the illustrated embodiments, whether the vehicle is running in the stepwise speed change control mode is judged by judging, according to the state switch map of FIG. 6, whether the vehicle state is in the stepwise speed change control area in which the transmission system 10, 70 should be switched to the stepwise speed change state. However, whether the vehicle is running in the stepwise speed change control mode may be judged by judging whether the switch 44 has been manually operated by the driver to switch the transmission system 10, 70 to the stepwise speed change state. Thus, the present invention is applicable to the case where the vehicle runs in the stepwise speed change control mode in response to the manual operation of the switch 44.

In addition, in each of the illustrated embodiments, the transmission system 10, 70 is arranged such that the non-step speed change portion 11 can be selectively switched to the differential state and to the non-differential state and accordingly the portion 11 can be selectively switched to the non-step speed change state in which the portion 11 operates as the electric CVT and to the stepwise speed change state in which the portion 11 operates as the stepwise variable transmission. However, the switching of the non-step speed change portion 11 between the non-step speed change state and the stepwise speed change state is an example of the switching of the same 11 between the differential state and the non-differential state. For example, when the non-step speed change portion 11 is in the differential state, the speed ratio of the portion 11 may be changed not continuously but stepwise, so that the portion 11 may operate as a stepwise variable transmission. In other words, the differential and non-differential states of the transmission system 10, 70 (or the non-step speed change portion 11) do not correspond, one by one, to the non-step and stepwise speed change states of the same 10, 70, respectively. Therefore, the transmission system 10, 70 need not be so arranged as to be selectively switchable to the non-step or stepwise speed change state. That is, the present invention is applicable to the case where the transmission system 10, 70 (the non-step speed change portion 11 or the power transfer 16) is so arranged as to be selectively switchable to the differential or non-differential state.

In addition, in each of the illustrated embodiments, the power transfer 16 includes the first carrier CA1 connected to the engine 8, the first sun gear S1 connected to the first electric motor M1, and the first ring gear R1 connected to the transmission member 18. However, the engine 8, the first motor M1, and the transmission member 18 may be connected to the three elements CA1, S1, R1 of the first planetary gear set 24, in different manners. For example, each of the engine 8, the first motor M1, and the transmission member 18 may be connected to any one of the three elements CA1, S1, R1.

In each of the illustrated embodiments, the engine 8 is directly coupled with the input shaft 14. However, the engine 8 may be operatively connected via a gear, a belt, etc. to the input shaft 14. Moreover, the engine 8 need not be provided such that the engine 8 is coaxial with the input shaft 14.

In each of the illustrated embodiments, the first and second electric motors M1, M2 are coaxial with the input shaft 14, the first motor M1 is connected to the first sun gear S1, and the second motor M2 is connected to the transmission member 18. However, the first motor M1 may be operatively connected via a gear, a belt, etc. to the first sun gear S1; and the second motor M2 may be operatively connected via a gear, a belt, etc. to the transmission member 18.

In each of the illustrated embodiments, the power transfer 16 includes the switching clutch C0 and the switching brake B0. However, it is not needed to employ both the clutch C0 and the brake B0. In addition, in each of the illustrated embodiments, the switching clutch C0 selectively connects the sun gear S1 and the carrier CA1 to each other. However, the clutch C0 may be modified such that the clutch C0 selectively connects the sun gear S1 and the ring gear R1 to each other, or selectively connects the carrier CA1 and the ring gear R1 to each other. In short, the switching clutch C0 may be modified such that the clutch C0 selectively connects arbitrary two elements of the three elements S1, CA1, R1 of the first planetary gear set 24.

In each of the illustrated embodiments, the transmission system 10, 70 is controlled to the neutral position "N", by causing the engaging of the switching clutch C0. However, the neutral position "N" may be established without causing the engaging of the clutch C0.

In each of the illustrated embodiments, the hydraulically operated frictional coupling devices such as the switching clutch and brake C0, B0 may be replaced with magnetic-powder type, electromagnetic type, or mechanical type coupling devices such as powder (magnetic powder) clutches, electromagnetic clutches, or dog clutches.

In each of the illustrated embodiments, the transmission system 10, 70 need not include the non-step speed change portion 11 having the illustrated construction. That is, the present invention is applicable to the case where at least one electric motor (e.g., the second motor M2) is connected to the input rotary member (e.g., the transmission member 18) of the stepwise speed change portion 20, 72.

In each of the illustrated embodiments, the second electric motor M2 is connected to the transmission member 18. However, the second motor M2 may be connected to the output shaft 22, or an arbitrary one of the rotary elements of the stepwise speed change portion 20, 72.

In each of the illustrated embodiments, the stepwise speed change portion 20, 72 is connected, in series, via the transmission member 18 to the non-step speed change portion 11. However, it is possible to provide a counter shaft extending parallel to the input shaft 14, and provide the stepwise speed change portion 20, 72 such that the portion 20, 72 is coaxial with the counter shaft. In the latter case, the non-step speed change portion 11 and the stepwise speed change portion 20,72 may be connected to each other via, e.g., a group of transmission members including a pair of counter gears, a sprocket, and a chain, such that the driving power can be transmitted from the portion 11 to the portion 20, 72.

In each of the illustrated embodiments, the power transfer 16 as the differential device may be replaced with, e.g., a differential gear unit including a pinion that is driven or rotated by the engine 8, a pair of bevel gears that are meshed with the pinion, and the first and second electric motors M1, M2 that are operatively connected to the two bevel gears.

In each of the illustrated embodiments, the power transfer 16 is constituted by the single planetary gear set. However, the power transfer 16 may be constituted by two or more planetary gear sets, so that the power transfer 16 can operate, in the non-differential state thereof, as a transmission having three or more speed steps.

In each of the illustrated embodiments, the switch 44 is of the seesaw type. However, the switch 44 may be replaced with any type of switch that is operable to select an arbitrary one of at least the non-step speed change state (the differential state) and the stepwise speed change state (the non-differential state); such as a pushbutton type switch, a pair of pushbutton type switches which cannot be concurrently kept at respective pushed states, i.e., either one of which can be kept at the pushed state thereof, a lever type switch, a slide type switch, etc. In addition, in each of the illustrated embodiments, the switch 44 may be modified to have the neutral operation position, as described previously. However, in place of the modification of the switch 44, it is possible to employ another switch that is operable to adopt or neglect the non-step or stepwise speed change state selected through the operation of the switch 44, i.e., select the neutral operation position of the switch 44.

It is to be understood that the present invention may be embodied with various other changes, modifications and improvements that may occur to a person skilled in the art, in the light of the technical teachings of the present invention that have been described above.

What is claimed is:

1. A control apparatus for controlling a driving device of a vehicle, the driving device including a transmission system including (A) a non-step speed change portion which includes (a1) a differential device including a first rotary element connected to an engine, a second rotary element connected to a first electric motor, and a third rotary element connected to a transmission member, and (a2) a second electric motor provided in a power transmission path between the transmission member and a plurality of drive wheels, and which functions as an electric, continuously variable transmission, and (B) a stepwise speed change portion which constitutes a portion of the power transmission path and functions as a stepwise automatic transmission, the control apparatus comprising:
   a differential-state switching device which is associated with the differential device and selectively switches the differential device to a differential state thereof in which the non-step speed change portion can operate as the electric continuously variable transmission, and to a non-differential state thereof in which the non-step speed change portion cannot operate as the electric continuously variable transmission; and
   a rotation speed synchronization controller which, when a stepwise speed change control of the transmission system is performed, performs, with at least one of the first and second electric motors, a synchronization control of respective rotation speeds of the first, second, and third rotary elements, to respective rotation speeds thereof after completion of the stepwise speed change control.

2. A control apparatus for controlling a driving device of a vehicle, the driving device including a transmission system including (A) a non-step speed change portion which includes (a1) a differential device including a first rotary element connected to an engine, a second rotary element connected to a first electric motor, and a third rotary element connected to a transmission member, and (a2) a second electric motor provided in a power transmission path between the transmission member and a plurality of drive wheels, and which functions as an electric, continuously variable transmission, and (B) a stepwise speed change portion which constitutes a portion of the power transmission path and functions as a stepwise automatic transmission, the control apparatus comprising:
   a differential-state switching device which is associated with the differential device and selectively switches the differential device to a differential state thereof in which the non-step speed change portion can operate as the electric continuously variable transmission, and to a non-differential state thereof in which the non-step speed change portion cannot operate as the electric continuously variable transmission; and
   a rotation speed synchronization controller which, when a stepwise speed change control of the transmission system is performed, performs, with at least one of the first and second electric motors, a synchronization control of a rotation speed of the engine to a rotation speed thereof after completion of the stepwise speed change control.

3. The control apparatus according to claim 1, wherein the differential-state switching device selectively establishes, as the non-differential state, one of a first non-differential state in which the first, second, and third rotary elements are rotated as a unit, and a second non-differential state in which the second rotary element is not rotated, and wherein the rotation speed synchronization controller selects, when the stepwise speed change control is performed, one of a plurality of different rotation speed synchronization control methods that corresponds to a judgment about whether a switching between the first and second non-differential states is performed.

4. The control apparatus according to claim 3, wherein when the stepwise speed change control is performed, the rotation speed synchronization controller temporarily switches, when the switching between the first and second non-differential states is performed, the differential device to the differential state thereof, and performs the synchronization control owing to an operation of the non-step speed change portion as the electric continuously variable transmission.

5. The control apparatus according to claim 3, wherein when the stepwise speed change control is performed, the rotation speed synchronization controller keeps, when the switching between the first and second non-differential states is not performed, the differential device to the non-differential state thereof, and performs the synchronization control.

6. The control apparatus according to claim 3, wherein the rotation speed synchronization controller performs, when said at least one of the first and second electric motors cannot be used, one of the stepwise speed change control of the stepwise speed change portion and the switching between the first and second non-differential states.

7. The control apparatus according to claim 3, wherein the differential-state switching device comprises at least one of (a) a clutch which connects at least two rotary elements of the first, second, and third rotary elements, to each other, so as to establish the first non-differential state and (b) a brake which connects the second rotary element to a non-rotary element so as to establish the second non-differential state.

8. The control apparatus according to claim 7, wherein the differential-state switching device comprises the clutch and the brake, wherein when the clutch and the brake are disengaged, the differential device is switched to the differential state thereof in which the first, second, and third rotary elements are rotated relative to each other and the non-step speed change portion operates as the electric continuously variable transmission, wherein when the clutch is engaged and the brake is disengaged, the differential device is switched to the first non-differential state thereof and the non-step speed change portion operates as a transmission whose speed ratio is equal to 1, and wherein when the brake is engaged and the clutch is disengaged, the differential device is switched to the second non-differential state thereof and the non-step speed change portion operates as a speed increase transmission whose speed ratio is smaller than 1.

9. The control apparatus according to claim 1, wherein the differential device comprises a planetary gear set including a carrier, a sun gear, and a ring gear, and the first, second, and third rotary elements of the differential device comprise the carrier, the sun gear, and the ring gear, respectively.

10. The control apparatus according to claim 9, wherein the planetary gear set comprises a single-pinion planetary gear set including a pinion.

11. A control apparatus for controlling a driving device of a vehicle, the driving device including a transmission system including (A) a differential system which includes (a1) a differential device including a first rotary element connected to an engine, a second rotary element connected to a first electric motor, and a third rotary element connected to a transmission member, and (a2) a second electric motor provided in a power transmission path between the transmission member and a plurality of drive wheels, and (B) a stepwise speed change portion which constitutes a portion of the power transmission path and functions as a stepwise automatic transmission, the control apparatus comprising:
a differential-state switching device which is associated with the differential device and selectively switches the differential device to a differential state thereof in which the differential system exhibits a differential function, and to a non-differential state thereof in which the differential system does not exhibit the differential function; and
a rotation speed synchronization controller which, when a stepwise speed change control of the transmission system is performed, performs, with at least one of the first and second electric motors, a synchronization control of respective rotation speeds of the first, second, and third rotary elements, to respective rotation speeds thereof after completion of the stepwise speed change control.

12. A control apparatus for controlling a driving device of a vehicle, the driving device including a transmission system including (A) a differential system which includes (a1) a differential device including a first rotary element connected to an engine, a second rotary element connected to a first electric motor, and a third rotary element connected to a transmission member, and (a2) a second electric motor provided in a power transmission path between the transmission member and a plurality of drive wheels, and (B) a stepwise speed change portion which constitutes a portion of the power transmission path and functions as a stepwise automatic transmission, the control apparatus comprising:
a differential-state switching device which is associated with the differential device and selectively switches the differential device to a differential state thereof in which the differential system exhibits a differential function, and to a non-differential state thereof in which the differential system does not exhibit the differential function; and
a rotation speed synchronization controller which, when a stepwise speed change control of the transmission system is performed, performs, with at least one of the first and second electric motors, a synchronization control of a rotation speed of the engine to a rotation speed thereof after completion of the stepwise speed change control.

13. The control apparatus according to claim 11, wherein the differential-state switching device selectively establishes, as the non-differential state, one of a first non-differential state in which the first, second, and third rotary elements are rotated as a unit, and a second non-differential state in which the second rotary element is not rotated, and wherein the rotation speed synchronization controller selects, when the stepwise speed change control is performed, one of a plurality of different rotation speed synchronization control methods that corresponds to a judgment about whether a switching between the first and second non-differential states is performed.

14. The control apparatus according to claim 13, wherein when the stepwise speed change control is performed, the rotation speed synchronization controller temporarily switches, when the switching between the first and second non-differential states is performed, the differential device to the differential state thereof, and performs the synchronization control.

15. The control apparatus according to claim 13, wherein when the stepwise speed change control is performed, the rotation speed synchronization controller keeps, when the switching between the first and second non-differential states is not performed, the differential device to the non-differential state thereof, and performs the synchronization control.

16. The control apparatus according to claim 13, wherein the rotation speed synchronization controller performs, when said at least one of the first and second electric motors cannot be used, one of the stepwise speed change control of the stepwise speed change portion and the switching between the first and second non-differential states.

17. The control apparatus according to claim 13, wherein the differential-state switching device comprises at least one of (a) a clutch which connects at least two rotary elements of the first, second, and third rotary elements, to each other, so as to establish the first non-differential state and (b) a brake which connects the second rotary element to a non-rotary element so as to establish the second non-differential state.

18. The control apparatus according to claim 1, wherein the differential device comprises a speed increase transmission.

19. The control apparatus according to claim 3, wherein the differential-state switching device comprises at least one of (a) a clutch which connects at least two rotary elements of the first, second, and third rotary elements, to each other, so as to establish the first non-differential state, and (b) a brake which connects the second rotary element to a non-rotary element so as to establish the second non-differential state, and wherein when the switching between the first and second non-differential states is performed, the rotation speed synchronization controller performs a quick control of said at least one of the clutch and the brake.

20. The control apparatus according to claim 13, wherein the differential-state switching device comprises at least one of (a) a clutch which connects at least two rotary elements of the first, second, and third rotary elements, to each other, so as to establish the first non-differential state, and (b) a brake which connects the second rotary element to a non-rotary element so as to establish the second non-differential state, and wherein when the switching between the first and second non-differential states is performed, the rotation speed synchronization controller performs a quick control of said at least one of the clutch and the brake.

* * * * *